US011860368B2

(12) United States Patent
Bedard et al.

(10) Patent No.: US 11,860,368 B2
(45) Date of Patent: Jan. 2, 2024

(54) CAMERA SYSTEM

(71) Applicant: Apple Inc., Cupertino, CA (US)

(72) Inventors: Noah D. Bedard, Pacifica, CA (US); Ricardo J. Motta, Palo Alto, CA (US); Emanuele Mandelli, Mountain View, CA (US); Daniel R. Hennigan, Livermore, CA (US); Kathrin Berkner Cieslicki, Los Altos, CA (US); Branko Petljanski, San Jose, CA (US); Brett D. Miller, Redwood City, CA (US); Kenichi Saito, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/933,060

(22) Filed: Sep. 16, 2022

(65) Prior Publication Data
US 2023/0185093 A1     Jun. 15, 2023

Related U.S. Application Data

(63) Continuation of application No. 17/276,476, filed as application No. PCT/US2019/053622 on Sep. 27, 2019, now Pat. No. 11,448,886.
(Continued)

(51) Int. Cl.
*G02B 27/01*     (2006.01)
*G03B 30/00*     (2021.01)

(52) U.S. Cl.
CPC ......... *G02B 27/0172* (2013.01); *G03B 30/00* (2021.01); *G02B 2027/014* (2013.01);
(Continued)

(58) Field of Classification Search
None
See application file for complete search history.

(56) References Cited

U.S. PATENT DOCUMENTS 7,515,177 B2   4/2009   Yoshikawa
9,813,673 B2   11/2017   Smits
(Continued)

FOREIGN PATENT DOCUMENTS

CN   1745337     3/2006
CN   107438788   12/2017
(Continued)

OTHER PUBLICATIONS

Chines Office Action from Application No. 201980062195.3, dated Feb. 17, 2023, pp. 1-6.
(Continued)

*Primary Examiner* — Edemio Navas, Jr.
(74) *Attorney, Agent, or Firm* — Robert C. Kowert; Kowert, Hood, Munyon, Rankin & Goetzel, P.C.

(57) ABSTRACT

A device for MR/VR systems that includes a two-dimensional array of cameras that capture images of respective portions of a scene. The cameras are positioned along a spherical surface so that the cameras have adjacent fields of view. The entrance pupils of the cameras are positioned at or near the user's eye while the cameras also form optimized images at the sensor. Methods for reducing the number of cameras in an array, as well as methods for reducing the number of pixels read from the array and processed by the pipeline, are also described.

20 Claims, 24 Drawing Sheets

Related U.S. Application Data

(60) Provisional application No. 62/739,107, filed on Sep. 28, 2018.

(52) U.S. Cl.
CPC .............. *G02B 2027/0123* (2013.01); *G02B 2027/0129* (2013.01); *G02B 2027/0138* (2013.01); *G02B 2027/0198* (2013.01)

(56) References Cited

U.S. PATENT DOCUMENTS

| | | |
|---|---|---|
| 9,977,248 B1 | 5/2018 | Xie et al. |
| 10,352,693 B2 | 7/2019 | Abovitz et al. |
| 10,466,478 B2 | 11/2019 | Klug et al. |
| 10,652,438 B2 | 5/2020 | Wippermann et al. |
| 10,996,460 B2 | 5/2021 | Wippermann et al. |
| 11,187,914 B2 | 11/2021 | Hennigan et al. |
| 11,448,886 B2 | 9/2022 | Bedard et al. |
| 2004/0238732 A1 | 12/2004 | State et al. |
| 2006/0114332 A1* | 6/2006 | Yoshikawa ............ G02B 13/06 348/218.1 |
| 2007/0091195 A1 | 4/2007 | Yoshikawa |
| 2015/0177514 A1 | 6/2015 | Maimone et al. |
| 2015/0247723 A1 | 9/2015 | Abovitz et al. |
| 2016/0109713 A1 | 4/2016 | Osterhout |
| 2016/0127646 A1 | 5/2016 | Osborne |
| 2016/0147045 A1 | 5/2016 | Masuda et al. |
| 2017/0059857 A1 | 3/2017 | Laroia et al. |
| 2017/0078653 A1 | 3/2017 | Bi et al. |
| 2017/0099479 A1 | 4/2017 | Browd et al. |
| 2017/0214863 A1 | 7/2017 | Narabu |
| 2018/0003999 A1 | 1/2018 | Minano et al. |
| 2018/0007255 A1 | 1/2018 | Tang |
| 2018/0128685 A1 | 5/2018 | Peloux et al. |
| 2018/0241920 A1 | 8/2018 | Wippermann et al. |
| 2019/0371028 A1 | 12/2019 | Harrises et al. |

FOREIGN PATENT DOCUMENTS

| | | |
|---|---|---|
| EP | 3229073 | 10/2017 |
| WO | 2017139871 | 8/2017 |

OTHER PUBLICATIONS

International Search Report and Written Opinion from PCT/US2019/053622, dated Apr. 7, 2020, pp. 1-19.

Office action and search report from Chinese Application No. 201980062195.3, dated May 27, 2022, (Chinese version only), pp. 1-7.

* cited by examiner

CAMERA SYSTEM

BACKGROUND

This application is a continuation of U.S. patent application Ser. No. 17/276,476, filed Mar. 15, 2021, which is a 371 of PCT Application No. PCT/US2019/053622, filed Sep. 27, 2019, which claims benefit of priority to U.S. Provisional Patent Application No. 62/739,107, filed Sep. 28, 2018. The above applications are incorporated herein by reference. To the extent that any material in the incorporated application conflicts with material expressly set forth herein, the material expressly set forth herein controls.

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Mixed reality (MR) covers a spectrum from augmented reality (AR) systems that combine computer generated information (referred to as virtual content) with views of the real world to augment, or add virtual content to, a user's view of their real environment (referred to as), to augmented virtuality (AV) systems that combine representations of real world objects with views of a computer generated three-dimensional (3D) virtual world. The simulated environments of virtual reality systems and/or the mixed environments of mixed reality systems may thus be utilized to provide an interactive user experience for multiple applications, such as applications that add virtual content to a real-time view of the viewer's environment, applications that generate 3D virtual worlds, interacting with virtual training environments, gaming, remotely controlling drones or other mechanical systems, viewing digital media content, interacting with the Internet, exploring virtual landscapes or environments, or the like.

SUMMARY

Various embodiments of scene cameras for video see-through head-mounted displays (HMDs) that may be used in mixed reality (MR) or virtual reality (VR) systems are described. In conventional HMDs, one or more scene cameras may be mounted at the front of the HMD. However, typically the entrance pupil and thus the point of view (POV) of the scene cameras is substantially offset from and thus different than the POV of the user's eyes. Embodiments of scene camera configurations are described that at least partially correct the point of view (POV) of the cameras to match the POV of the user by shifting the entrance pupils of the cameras towards the user's eyes.

In some embodiments, an HMD includes two-dimensional arrays of small form factor cameras (e.g., one array for the left eye, and a second array for the right eye) that capture images of respective portions of a real-world scene in front of the user. The cameras are positioned along a spherical curve or surface so that the cameras have non-overlapping, adjacent fields of view (FOVs). To achieve a more accurate representation of the perspective of the user, the cameras' optics are configured so that the entrance pupils of the cameras in the array are positioned behind the cameras' image planes formed at the image sensors, and at or near the user's eye while the cameras also form optimized images at the sensor. Thus, each array of cameras captures views of the scene from substantially the same perspective as the user's respective eye.

Each camera in an array is configured to jointly optimize the entrance pupil plane at the user's eye and the image plane at the camera's sensor. In some embodiments, each camera includes, in order from the object side to the image side, a first lens group including one or more lens elements, an aperture stop (e.g., a "pinhole" aperture stop), a second lens group including one or more lens elements, and a sensor. The lens element(s) in the first lens group may be formed (e.g., cut or "diced") so that the cameras fit together in the array with minimal or no gaps between the lenses in the first lens group.

To capture a sufficiently wide field of view (FOV) for each eye (e.g., 90-140 degrees on the horizontal axis and on the vertical axis), a two-dimensional array that includes many small form factor cameras each with a relatively narrow FOV (e.g., 10-15 degrees) may be used for each eye, with the cameras arranged and configured so that the FOVs of adjacent cameras are adjacent with no parallax between the cameras. Thus, each array may include many cameras (e.g., 50-100 cameras per eye). Further, the sensor of each of the cameras captures multi-pixel images. In a non-limiting example, the sensors may be configured to capture 32 pixels per degree (PPD), and each camera may cover 12×12 degrees of the FOV. In this example, each camera captures images that include about 150,000 pixels. Thus, the total number of pixels captured by each camera array may be large (in this example, 7 to 15 megapixels, depending on the number of cameras in the array).

In some embodiments, to capture and process the images captured by the cameras in the arrays, vertical strips or columns of sensors in the camera array are connected to buses. Thus, the sensors in a column share the physical layer of the output interface. Horizontal strips or rows of sensors consisting of one sensor from each vertical strip are sequentially read out and written to a buffer; the buses allow the sensors in a strip to all be read at the same time. A processing pipeline fetches and processes a strip of images from the buffer to generate an image, referred to as a display strip, which is sent to the display panel of the HMD for display, fetches and processes the next buffered strip of images, and so on. At the same time, the system continues to capture and buffer strips of images from the sensors. Thus, display strips may be displayed from the top of the display panel to the bottom, and then again from the top of the display panel to the bottom, and so on.

In addition, methods for reducing the number of cameras required per eye, as well as methods for reducing the number of pixels that are read from the array of camera sensors and processed by the pipeline, are described.

In some embodiments, the number of cameras in an array may be reduced using a prism and camera to capture a part (e.g., a peripheral region) of the field of view (FOV). The array of cameras correct the point of view (POV) for a respective portion of the FOV. The prism allows the entrance pupil of the camera that captures images of the peripheral region of the scene to be moved closer to the user's eye than in a conventional camera, thus at least partially correcting the POV for that portion of the FOV.

In some embodiments, the number of cameras in an array may be reduced using a standard front-facing camera to capture at least a part of the FOV. In these embodiments, the array of cameras correct the POV for a region of interest.

The remaining portion of the FOV is covered by the standard front-facing camera, which has a POV offset with respect to the user's eye.

In some embodiments, the number of pixels that are read from the sensors in the camera array and processed by the pipeline may be reduced by reducing resolution of the cameras in peripheral regions. In some embodiments, the number of cameras in an array may be reduced by reducing resolution and increasing FOV of the cameras in peripheral regions. In some embodiments, the number of cameras in an array may be reduced by reducing resolution, increasing FOV, and shifting the entrance pupil of the cameras in peripheral regions.

In some embodiments, slight parallax may be introduced to the cameras in the array to reduce vignetting and increase spacing between the cameras.

In some embodiments, one sensor may be used to capture images for multiple (e.g., four) cameras in the array. In these embodiments, the optics of the cameras used with a sensor may be shifted or adjusted to align the image planes with the sensor surface.

In some embodiments, a curved sensor and a simpler lens system may be used to provide a wider FOV for each camera and thus reduce the number of cameras in the array.

In some embodiments, a negative meniscus lens may be placed in front of an array of identical cameras to provide progressively wider FOVs and lower resolution towards the periphery of array, and to progressively offset the POV towards the periphery of the array.

BRIEF DESCRIPTION OF THE DRAWINGS

FIGS. 7A through 7D illustrate reducing the number of pixels by reducing resolution of the cameras in peripheral regions, according to some embodiments.

Figure 1A:
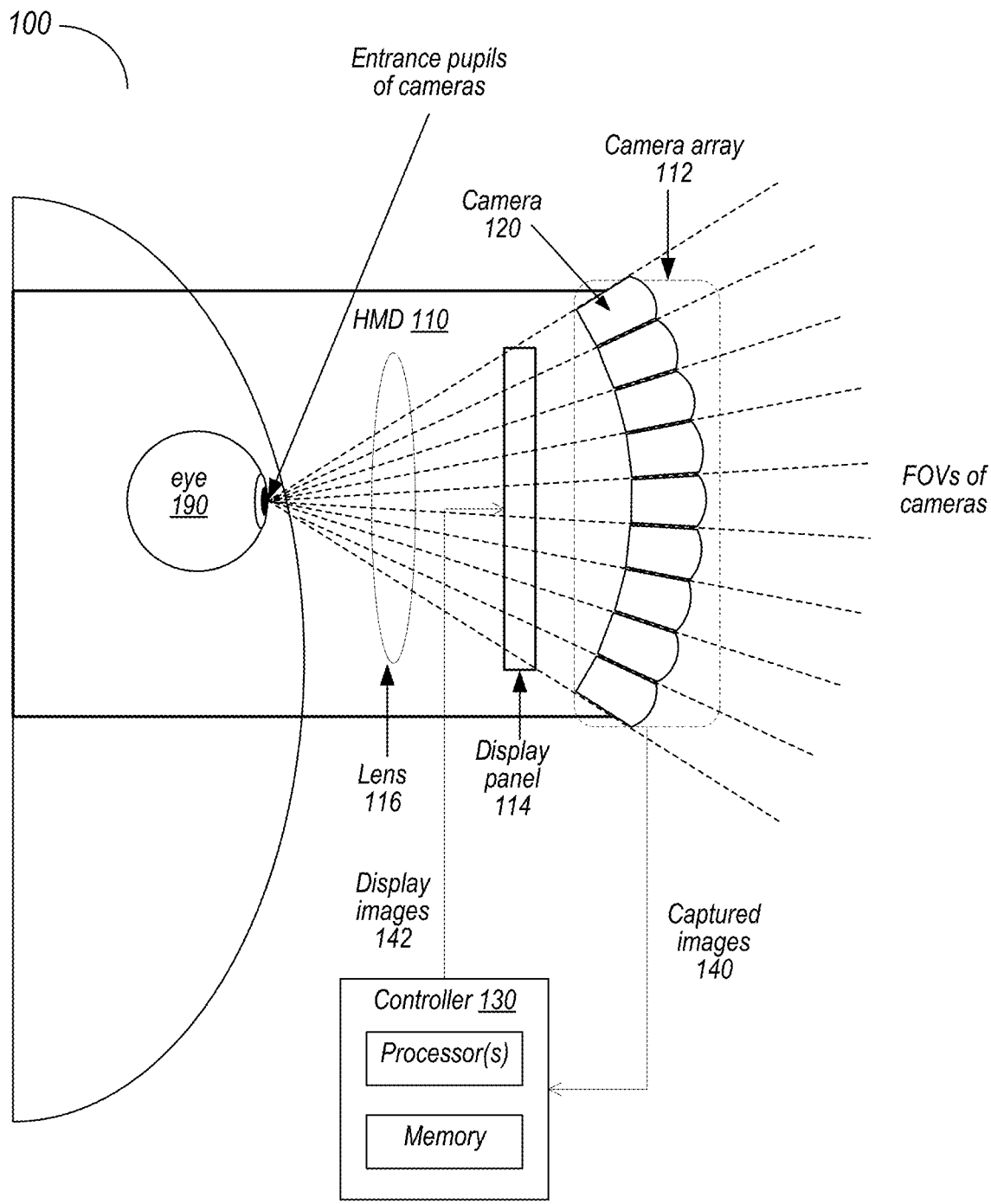
FIG. 1A illustrates a head-mounted display (HMD) that includes an array of cameras with entrance pupils at or near the user's eye, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of scene cameras for video see-through head-mounted displays (HMDs) that may be used in mixed reality (MR) or virtual reality (VR) systems are described. In conventional HMDs, one or more scene cameras may be mounted at the front of the HMD that capture images of the real-world scene in front of the user; the images are processed and displayed to display panels of the HMD. However, typically the entrance pupil and thus the point of view (POV) of these conventional scene cameras is substantially offset from and thus different than the POV of the user's eyes. Embodiments of scene camera configurations are described that at least partially correct the point of view (POV) of the cameras to match the POV of the user by shifting the entrance pupils of the cameras towards the user's eyes. Thus, the scene cameras may capture images of the environment from substantially the same perspective as the user's eyes.

FIG. 1A illustrates a head-mounted display (HMD) 110 for an MR/VR system 100 that includes an array 112 of cameras 120 with entrance pupils at or near the user's eye 190, according to some embodiments. The HMD 110 includes one or more display panels 114 (e.g., one display panel 114 for each eye 190) and one or more lenses 116 (e.g., one lens 116 for each eye) through which the user views images displayed on the display panels 114. System 100 also includes a controller 130, comprising one or more processors and memory, which is coupled to the cameras 120 and to the display panels 114 via wired or wireless interfaces. Controller 130 may be integrated in HMD 110, or alternatively may be a component of a separate device or base station that communicates with the HMD 110 via one or more wired or wireless interfaces. Controller 130 may be or may include an FPGA (field programmable gate array), an ISP (image signal processor), an SOC (system on a chip), or other appropriate technology.

Figure 2:
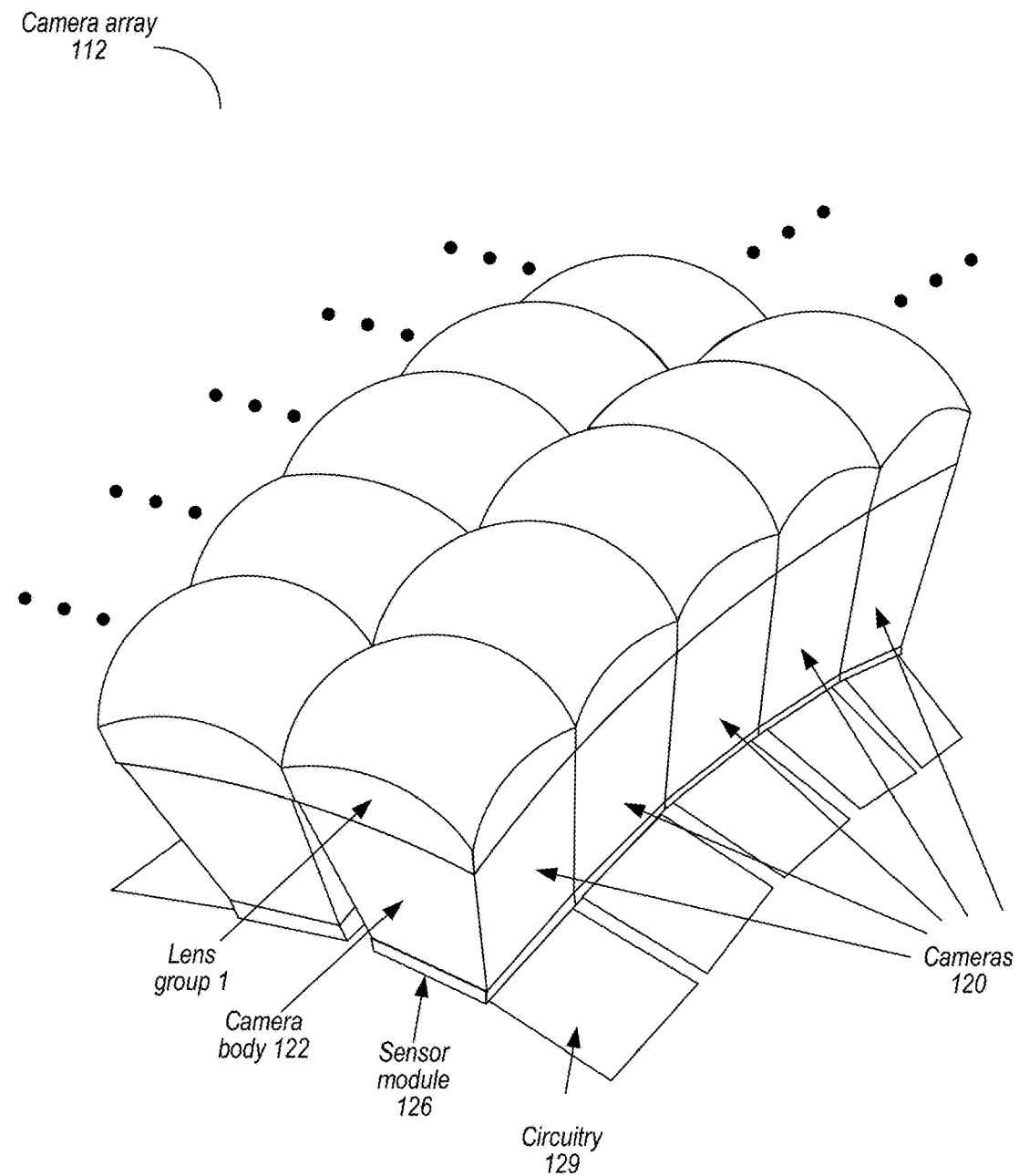
FIG. 2 illustrates a portion of a camera array, according to some embodiments.

The HMD 110 may include two camera arrays 112 (one array 112 for the left eye, and a second array 112 for the right eye). In some embodiments, the cameras 120 in an array 112 are positioned along a spherical curve or surface so that the cameras 120 have non-overlapping, adjacent fields of view (FOVs). Each camera 120 in an array 112 captures images of a respective portion of a real-world scene in front of the user. To achieve a more accurate representation of the perspective of the user, the cameras' optics are configured so that the entrance pupils of the cameras 120 in the array 112 are positioned behind the image planes formed at the camera sensors and at or near the user's eye 190. An example camera 120 is shown in FIG. 2. Thus, the camera arrays 112 capture views of the scene from substantially the same perspective as the user's eyes.

In some embodiments, to capture a sufficiently wide field of view (FOV) for each eye 190 (e.g., 90-140 degrees on the horizontal axis and on the vertical axis), a two-dimensional array 112 that includes many small form factor cameras 120 each with a relatively narrow FOV (e.g., 10-15 degrees) may be used for each eye 190, with the cameras 120 arranged and configured so that the FOVs of adjacent cameras 120 are adjacent with no parallax between the cameras 120. Thus, each array 112 may include many cameras 120 (e.g., 50-100 cameras per eye). Further, the sensor of each of the cameras 120 captures multi-pixel images. In a non-limiting example, the sensors may be configured to capture 32 pixels per degree (PPD), and each camera may cover 12×12 degrees of the FOV. In this example, each camera 120 captures images that include about 150,000 pixels. Thus, the total number of pixels captured by each camera array 112 may be large (in this example, 7 to 15 megapixels, depending on the number of cameras in the array 112).

Figure 1B:
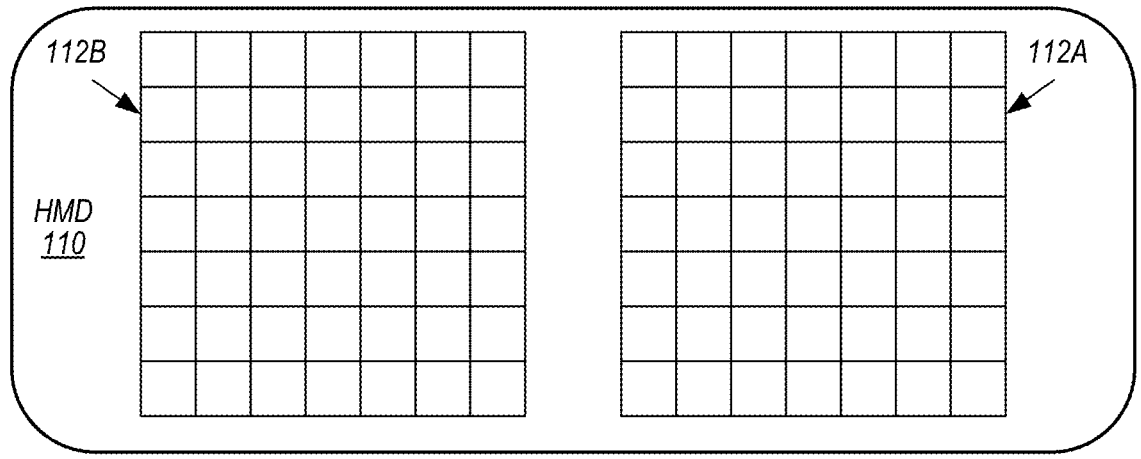
FIGS. 1B through 1E illustrate example configurations of the camera arrays on the front of an HMD.
Figure 1C:
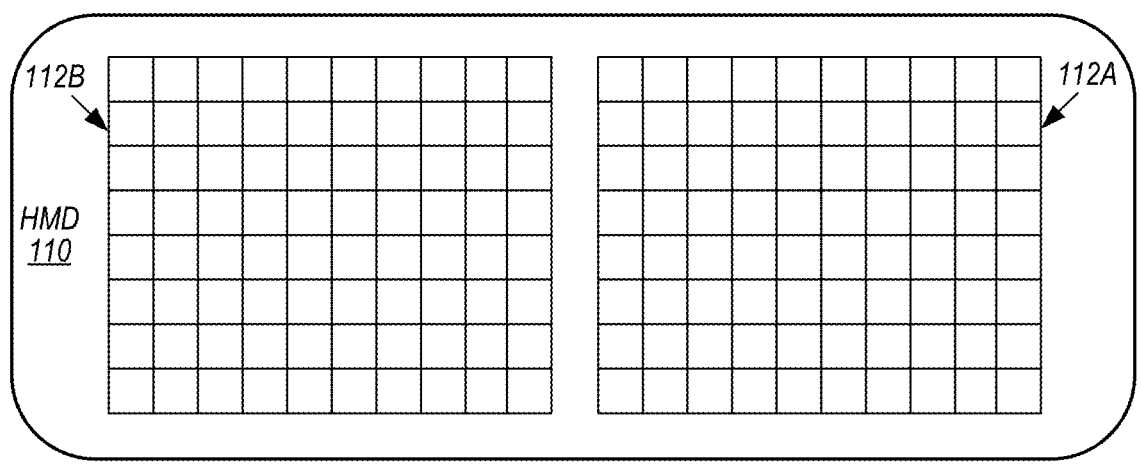
Figure 1D:
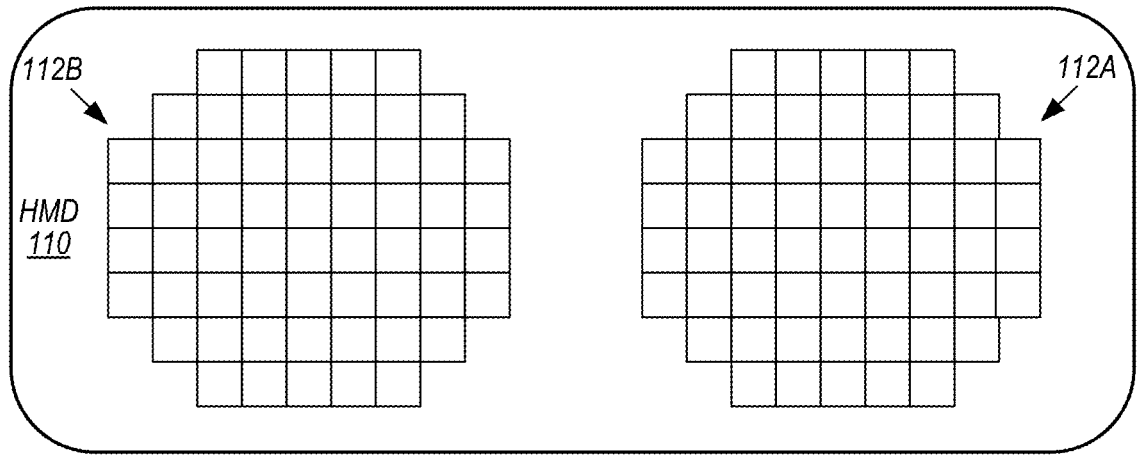
Figure 1E:
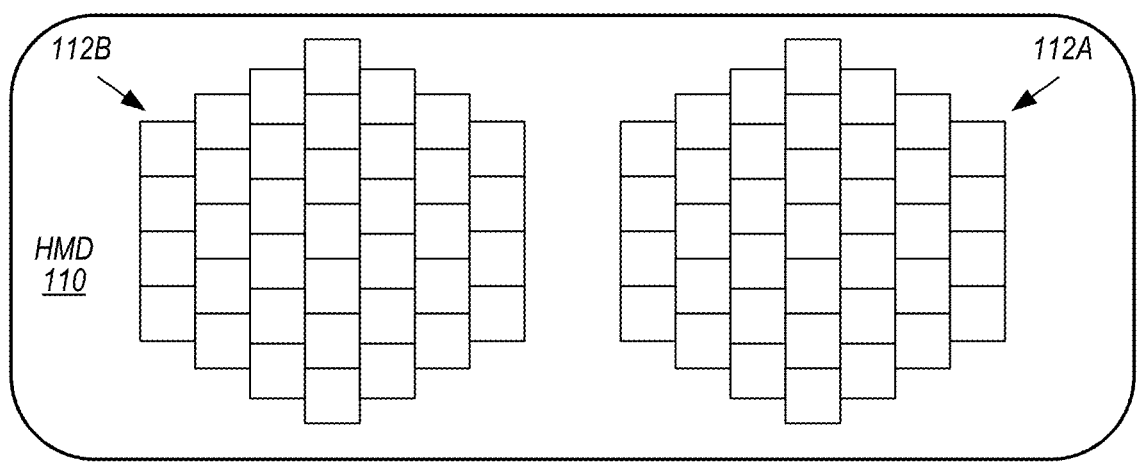

FIGS. 1B through 1E illustrate example, non-limiting configurations of the camera arrays 112 on the front of an HMD 110. FIG. 1B shows example square camera arrays with M×M cameras 120 in each array 112A (left eye array) and 112B (right eye array). This example shows 7×7 camera arrays 112; however, more or fewer cameras 120 may be used in embodiments. FIG. 1C shows example rectangular camera arrays with M×N cameras 120 in each array 112A and 112B. This example shows 8×10 camera arrays 112; however, more or fewer cameras 120 may be used in embodiments. FIG. 1D shows that other shapes may be used for the arrays 112 in some embodiments. This example shows a roughly oval or hexagonal shape in which each array 112 includes sixty cameras 120. As shown in FIG. 1E, in some embodiments, the rows or columns of cameras 120 may be staggered.

Figure 4:
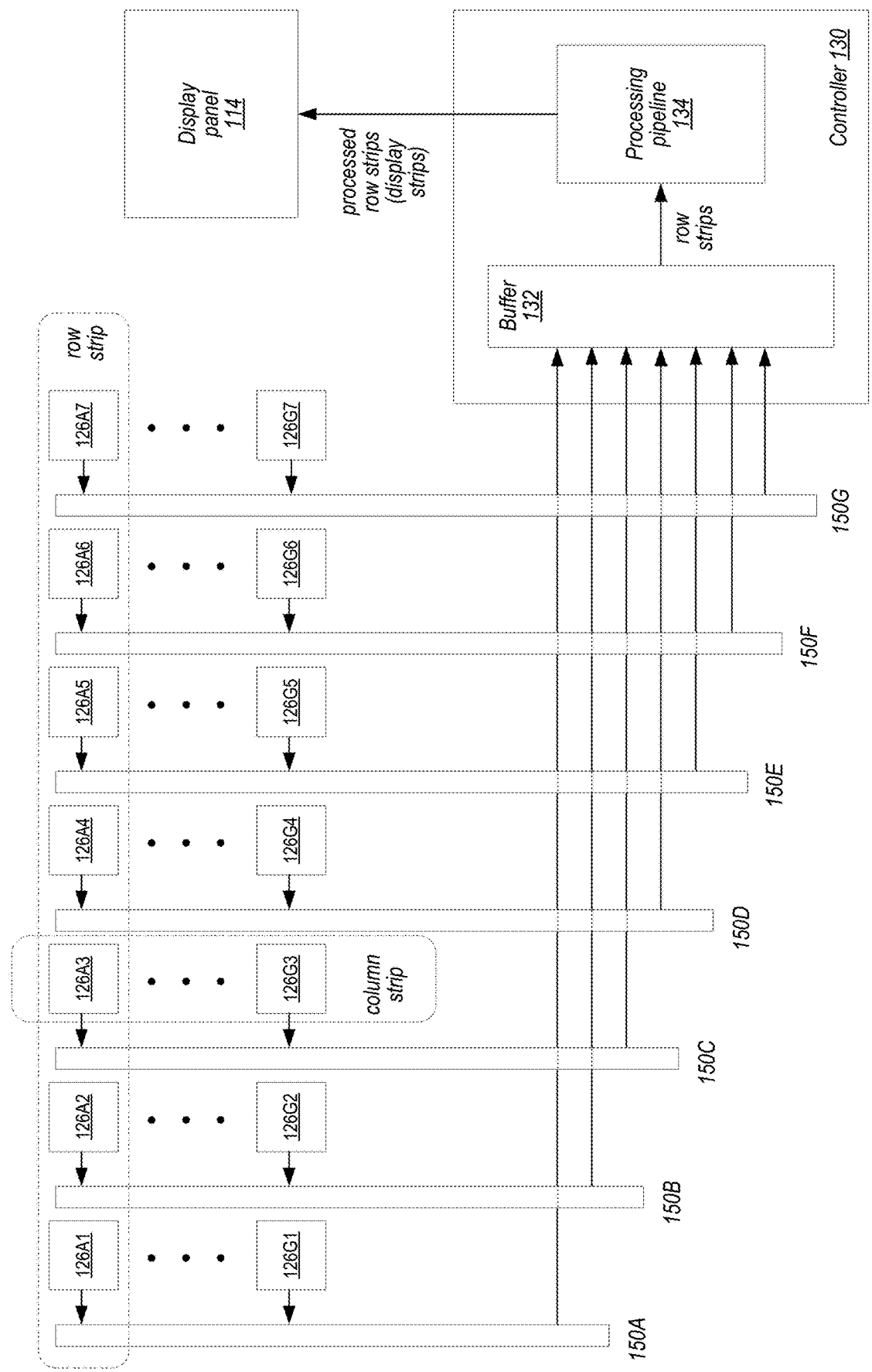
FIG. 4 illustrates an apparatus for capturing and processing the images captured by the cameras in an array, according to some embodiments.

FIG. 2 illustrates a portion of a camera array 112, according to some embodiments. The cameras 120 are positioned along a spherical curve or surface so that the cameras 120 have non-overlapping, adjacent fields of view (FOVs). In some embodiments, each camera 120 includes, in order from the object side to the image side, a lens group 1 including one or more lens elements, a camera body 122 that includes an aperture stop (e.g., a "pinhole" aperture stop) and a second lens group including one or more lens elements, and a sensor 126 module. The lens element(s) in lens group 1 may be "diced" so that the cameras 120 fit together in the array 112 with minimal or no gaps between the lenses of the cameras 120 in the array 112. Each camera 120 may also include circuitry 129 (e.g., a flex circuit board) via which the camera 120 sensor 126 modules may be connected to controller(s) 130 for image retrieval and processing. FIG. 4 illustrates an example architecture for connecting the sensors 126 to controller(s) 130 that may be used in some embodiments.

Figure 3:
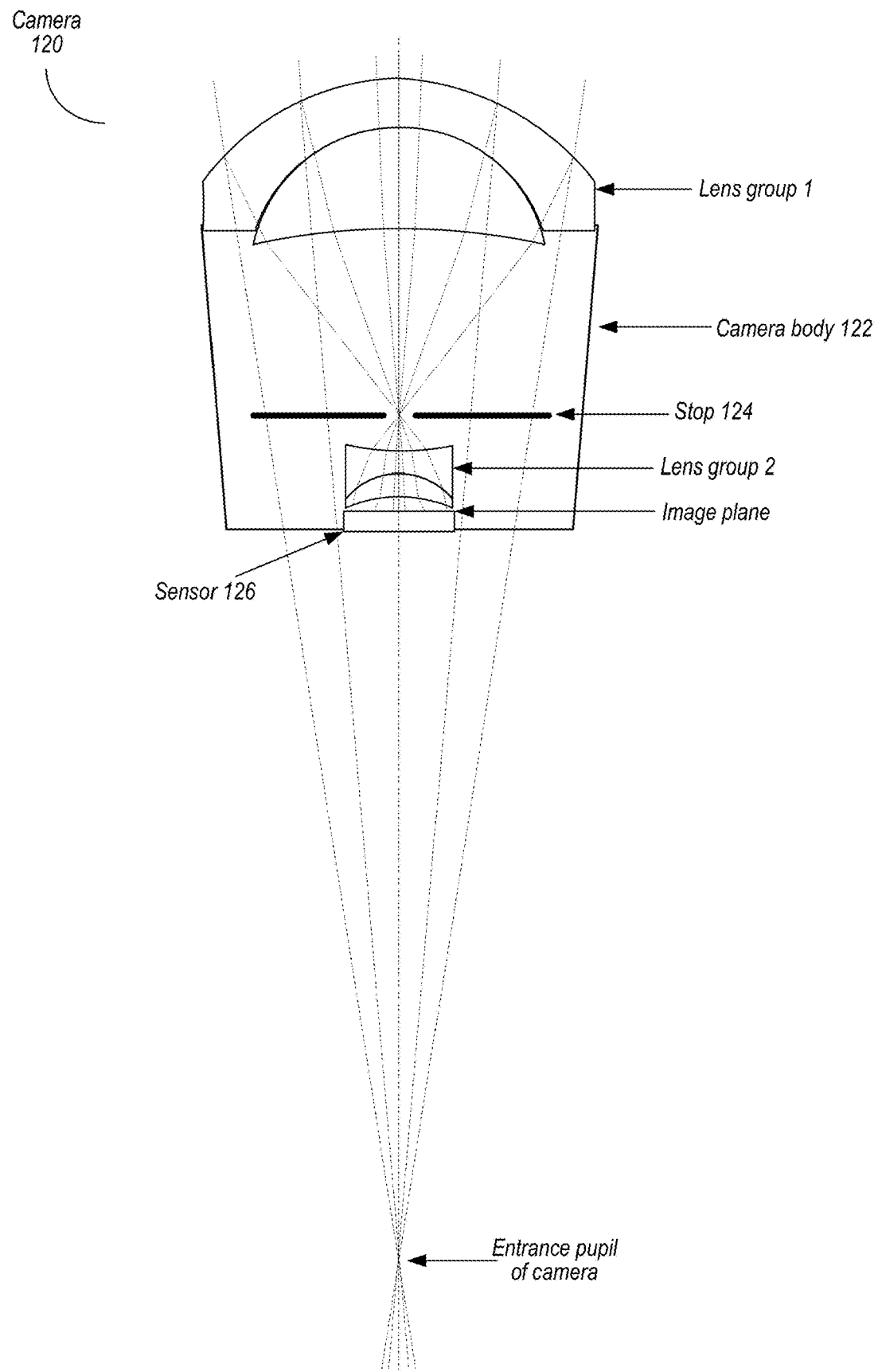
FIG. 3 illustrates an example camera with entrance pupil at or near the user's eye that may be used in an array as illustrated in FIGS. 1A through 2, according to some embodiments.

FIG. 3 illustrates an example camera 120 with entrance pupil at or near the user's eye that may be used in an array 112 as illustrated in FIGS. 1A through 2, according to some embodiments. In some embodiments, a camera 120 includes, in order from the object side to the image side, a lens group 1 including one or more lens elements (two, in this example), a camera body 122 that includes an aperture stop 124 (e.g., a "pinhole" aperture stop) and a lens group 2 including one or more lens elements (two, in this example), and a photosensor 126.

Each camera 120 in an array 112 is configured to jointly optimize the entrance pupil at a plane at the user's eye and the image at an image plane at the camera's sensor 126. The entrance pupil of the 120 camera is an image (in 3-D space) of the aperture stop 124 as seen through the object-side surface of lens group 1. Chief rays pass through the center of the entrance pupil. The position of the entrance pupil defines the "perspective point" or "view point" of the camera 120. A chief ray is a ray from an off-axis point in the object being observed that passes through the center of the aperture stop 124. Every point in the scene has a corresponding chief ray. A special chief ray that passes through the center of the object's X-Y plane and the center of the aperture stop 124 is referred to as the optical axis.

Aperture stop 124 creates a virtual image (the entrance pupil) of the light refracted by lens group 1 at a plane behind the image plane formed at the sensor 126 and at or near the subject's eye. Lens group 1 and stop 124 are configured to optimize the virtual image at the entrance pupil plane. For example, spherical aberration of the entrance pupil may be controlled to <5 mm axial, and "field gaps" may be limited to <0.5 mm between chief rays. However, lens group 1 may not form a good image at the sensor 126. Lens group 2 is thus included between stop 124 and sensor 126 and configured to correct for aberrations to optimize the image formed at the image plane at or near the surface of sensor 126.

In a non-limiting example, lens group 1 and lens group 2 may be cemented doublet lenses. Lens group 1 may have positive refractive power, and lens group 2 may have negative refractive power. The entrance pupil of the camera 120 may be 38 to 42 mm (e.g., 39.7 mm) from the first surface of the first lens group. Dimensions of the camera lens may be 3 mm×3 mm×10 mm (XYZ). However, larger or smaller lenses may be used in some embodiments. In the example embodiment, surface forms of lens group 1 may be Spherical-Spherical-Aspherical from the object side to the image side, and surface forms of lens group 2 may be Spherical-Spherical-Aspherical from the object side to the image side. The lens elements may be composed of an optical glass or plastic material. In some embodiments, at least two of the lens elements may be composed of different materials. As a non-limiting example, the doublet lenses in lens group 1 may be composed of SNPH2/LAH58 materials, the doublet lenses in lens group 1 may be composed of FL4/LTIM28P materials. In an example embodiment, optical characteristics of the camera 120 include:

Field of view: 14 degrees (diagonal)
Focal Length: 8.5 mm
F/#: 8.5
Optical total track length (TTL): 10 mm Note, however, that one or more of the optical characteristics of the camera 120 may vary based at least in part on the particular application of the camera. For example, field of view of the camera may vary within a range of 10 to 25 degrees, focal length of the camera may vary within a range of 4 to 12 millimeters, F/# of the camera may vary within a range of 4 to 10, and TTL of the camera may vary within a range of 7 mm to 15 mm. However, values for one or more of these optical characteristics may fall outside these ranges based on the particular application.

Figure 21:
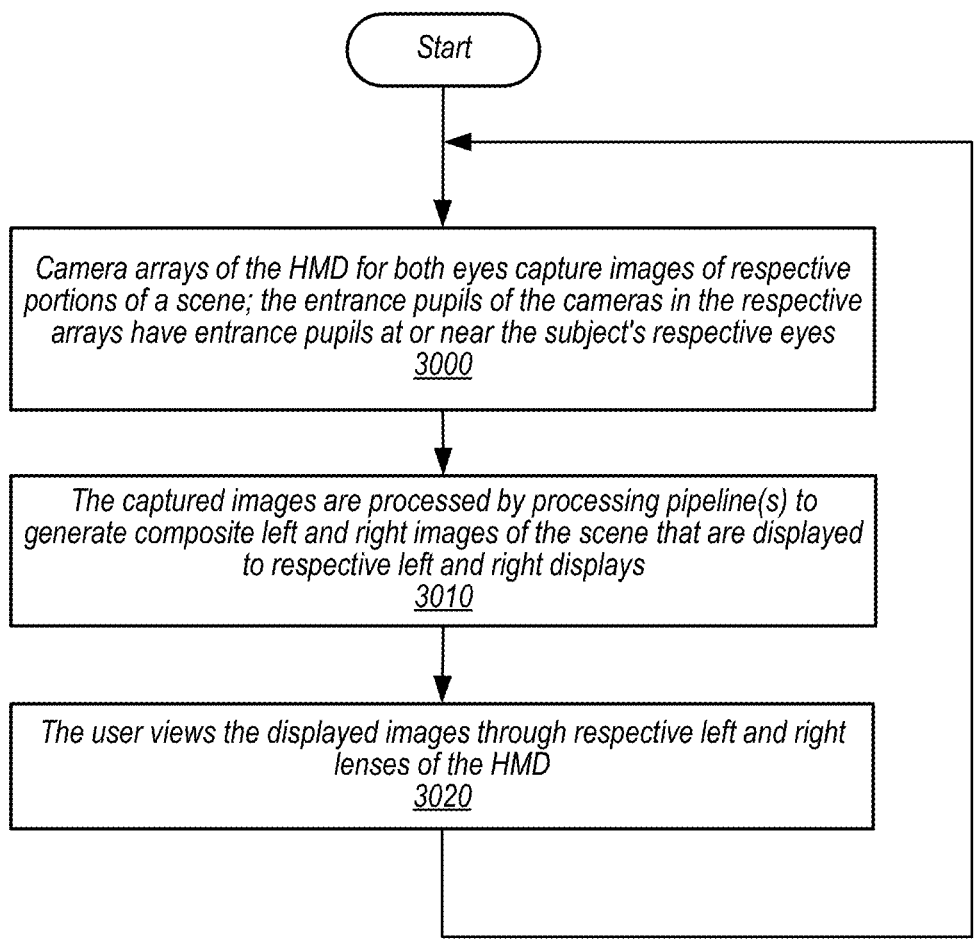
FIG. 21 is a high-level flowchart of a method of operation for an MR/VR system as described herein, according to some embodiments.

FIG. 21 is a high-level flowchart of a method of operation for an MR/VR system 100 as illustrated in FIG. 1A, according to some embodiments. As indicated at 3000, camera arrays 112 of the HMD 110 capture images of respective portions of a scene. As shown in FIG. 1A, the entrance pupils of the cameras 120 in the respective arrays 112 have entrance pupils at or near the subject's respective eyes 190. The images 140 captured by the cameras 120 are sent to controller 130. As indicated at 3010, the captured images are processed by one or more image processing pipelines of the controller 130 to generate composite left and right images 140 of the scene that are displayed to respective left and right display panels 114 of the HMD 110. As indicated at 3020, the user views the displayed images 140 through respective left and right lenses 116 of the HMD 110.

As previously mentioned, each array 112 of an HMD 110 as illustrated in FIG. 1A may include many cameras 120 (e.g., 50-100 cameras per eye). The sensors 126 of all of the cameras 120 are connected and continuously capturing and streaming out images. Further, each of the cameras 120 captures multi-pixel images. Thus, the total number of pixels captured by each camera array 112 may be large. An MR/VR system 100 requires a relatively fast frame rate with low latency between image capture and display to provide the user with a good viewing experience. In addition, it is desirable to simplify the connection of the array 112 of cameras 120 to a controller 130. FIG. illustrates an apparatus that may be used to simplify the connection of the sensors 126 to the controller, transmit the sensor data to the controller 130 for processing, and to process the images captured by the sensors 126 at a rate that provides a good viewing experience to the user.

FIG. 4 illustrates an apparatus for capturing and processing the images 140 captured by the cameras 120 in an array 112, according to some embodiments. The image sensors 126 are arranged in rows and columns. The HMD 110 includes a bus 150 for each column of image sensors 126. The image sensors 126 in each column of are connected to a respective 150 bus so the sensors 126 in each column share a physical layer of an output interface. The system 100 also includes a controller 130, comprising one or more processors and memory, which is coupled to the cameras 120 and to the display panel 114 via wired or wireless interfaces. At least a portion of the controller 130 memory may be configured as a buffer 132 for storing image data read from sensors 126. At least one of the one or more processors of the controller 120 may implement an image processing pipeline 134. Controller 130 may be integrated in HMD 110, or alternatively may be a component of a separate device or base station that communicates with the HMD 110 via one or more wired or wireless interfaces. Controller 130 may be or may include an FPGA (field programmable gate array), an ISP (image signal processor), an SOC (system on a chip), or other appropriate technology.

This example uses a 7×7 array 112 that includes seven rows and seven columns of cameras 120. However, this apparatus could be applied or adapted to other array 112 configurations including more or fewer cameras 120, for example as illustrated in FIGS. 1B through 1E.

Vertical strips or columns of sensors 126 in the camera array 120 are connected to buses 150A-150G. For example, sensors 126A3-126G3 compose one vertical strip or column (column 3) that are connected to bus 150C. Thus, the sensors 126 in a column share the physical layer of the output interface. Horizontal strips or rows of sensors 126 consisting of one sensor 126 from each vertical strip are sequentially read out via respective buses 150 and written to buffer 132 of controller 130. The buses 150 allow the sensors 126 in a row strip to all be read at substantially the same time. For example, sensors 126A1-126A7 compose one horizontal strip or row (row 1) that are all read at substantially the same time.

A processing pipeline 134 of the HMD controller 130 that includes one or more processors fetches and processes a strip of images from the buffer 132 to generate an image, referred to as a display strip, which is sent to the display panel 114 of the HMD 110 for display, fetches and processes the next buffered strip of images, and so on. At the same time, the system continues to capture and buffer strips of images from the sensors 126. Thus, display strips are displayed from the top of the display panel 114 to the bottom, and then again from the top of the display panel 114 to the bottom, and so on. Note that this apparatus could be otherwise arranged; for example, the rows of sensors 126 could be read and processed from bottom to top, or horizontal strips of sensors 126 could be connected to buses 150 and vertical strips of sensors 126 could be read.

Figure 22:
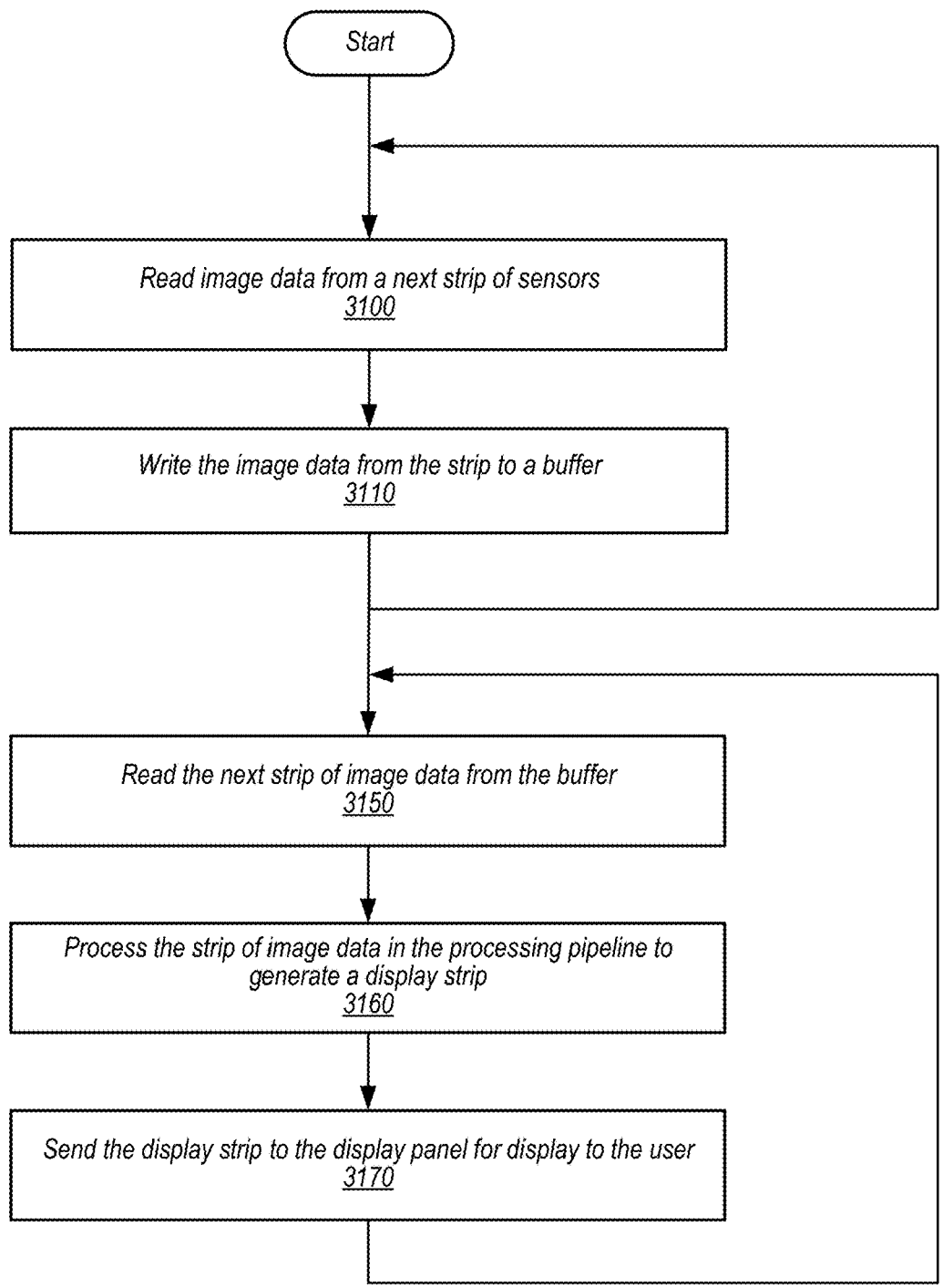
FIG. 22 is a flowchart of a method for capturing and processing the images captured by the cameras in an array, according to some embodiments.

FIG. 22 is a flowchart of a method for capturing and processing the images captured by the cameras in an array as illustrated in FIG. 4, according to some embodiments. The image sensors 126 are arranged in rows and columns as shown in FIG. 4. The HMD includes a bus 150 for each column of image sensors 126. The image sensors 126 in each column are connected to a respective 150 bus so the sensors 126 in each column share a physical layer of an output interface.

As indicated at 3100, image data is read from a strip (e.g., a horizontal strip) of sensors 126 as illustrated in FIG. 4 via respective buses 150. The image data read from the strip of sensors is written to a buffer 132 as essentially one long image, referred to as a row strip. The method then returns to element 3100 to read the images from the next row of sensors 126 and write the images to the buffer 132. This process continues as long as the user is using the HMD 112.

Elements 3150-3170 may be performed by a processing pipeline 134 of controller 130. As indicated at 3150, a next strip of image data is read from the buffer. As indicated at 3160, the strip of image data is processed by the processing pipeline to generate a display strip. As indicated at 3170, the display strip is sent to a display panel 114 for display to the user. The method then returns to element 3150 to fetch the next strip of image data. This process continues as long as the user is using the HMD 112.

As previously mentioned, each array 112 of an HMD 110 as illustrated in FIG. 1A may include many cameras 120 (e.g., 50-100 cameras per eye). Further, the sensor of each of the cameras 120 captures multi-pixel images. In a non-limiting example, the sensors may be configured to capture 32 pixels per degree (PPD), and each camera may cover 12 degrees of the FOV. In this example, each camera 120 captures images that include about 150,000 pixels. Thus, the total number of pixels captured by each camera array 112 may be quite large (in this example, 7 to 15 megapixels, depending on the number of cameras in the array 112). FIGS. 5 through 20C illustrate several methods for reducing the number of cameras 120 required per eye, as well as methods for reducing the number of pixels that are read from the array of camera 120 sensors and processed by the pipeline.

Figure 5:
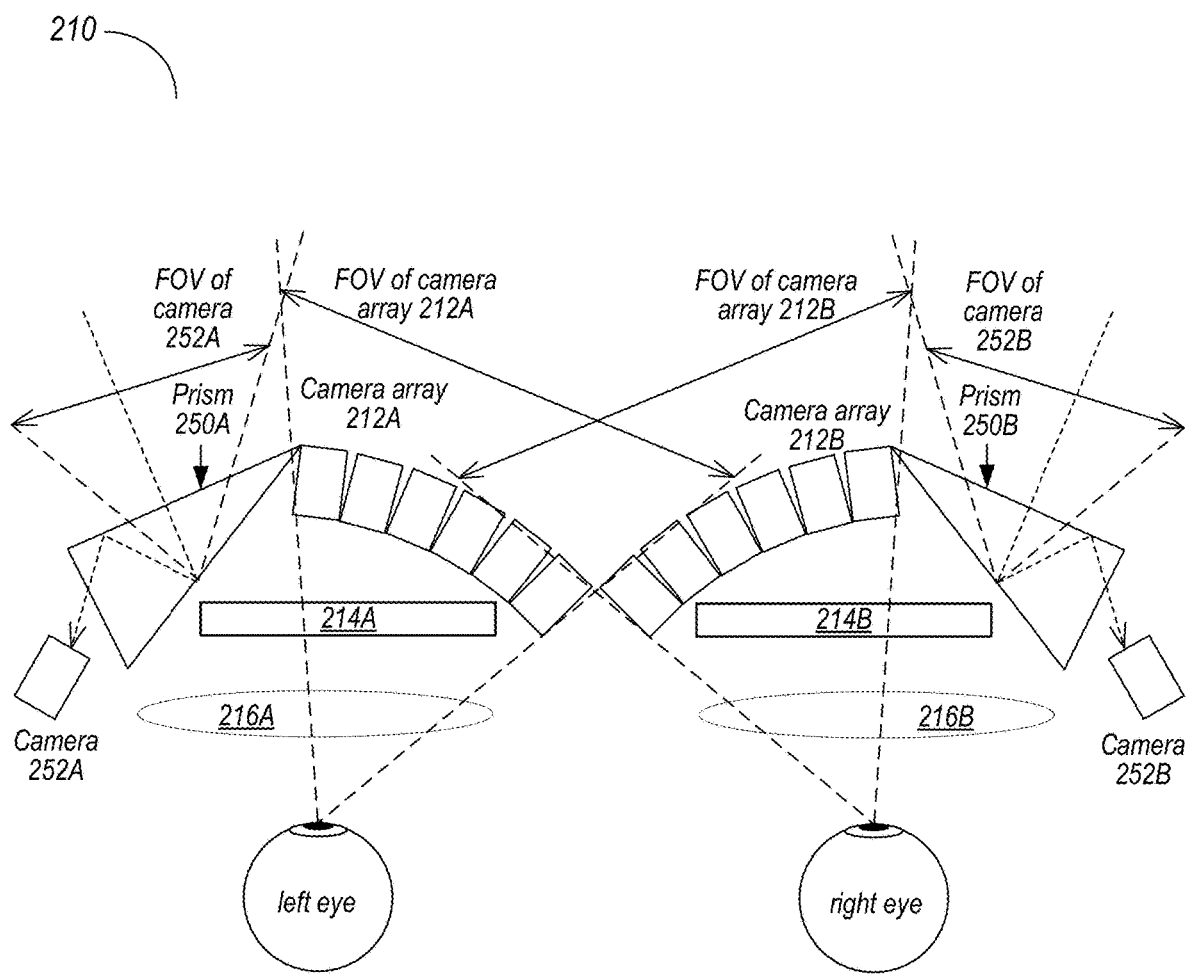
FIG. 5 illustrates using a prism and camera to reduce the number of cameras in the arrays, according to some embodiments.

FIG. 5 illustrates using a prism and camera to reduce the number of cameras in the arrays, according to some embodiments. In some embodiments, the number of cameras in an array 212 may be reduced using a prism 250 and camera 252 to capture a part (e.g., a peripheral region) of the field of view (FOV). The HMD 210 includes one or more display panels 214 (e.g., one display panel 214 for each eye), one or more lenses 216 (e.g., one lens 216 for each eye) through which the user views images displayed on the display panels 214, camera arrays 212A and 212B, prisms 250A and 250B, and cameras 252A and 252B. Camera array 212 includes cameras (e.g., as illustrated in FIGS. 2 and 3) that cover a portion (e.g., 60 degrees) of the FOV. The optics of the cameras in the arrays 212 are configured so that the entrance pupils of the cameras in each array 212 are at or near the subject's respective eye to correct the point of view (POV) for the respective portion of the FOV. Each prism 250A reflects light that enters the object side surface of the prism to a respective camera 252, as shown in FIG. 5, to cover a peripheral portion (e.g., 55 degrees) of the FOV. The prisms 250A and 250B allow the entrance pupils of cameras 252A and 252B that captures images of the peripheral regions of the scene to be moved closer to the user's eye than in a conventional front-facing camera, thus at least partially correcting the POV for the peripheral portion of the FOV.

Figure 6A:
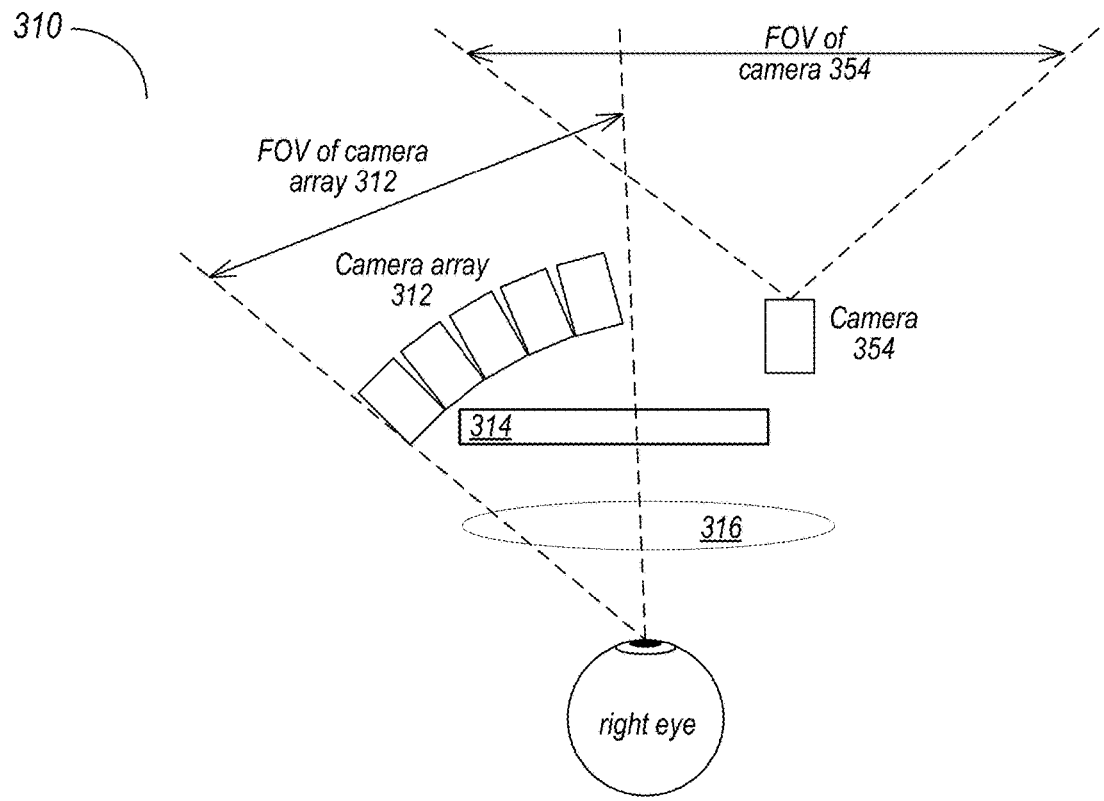
FIGS. 6A and 6B illustrate using a front-facing camera to reduce the number of cameras in the arrays, according to some embodiments.
Figure 6B:
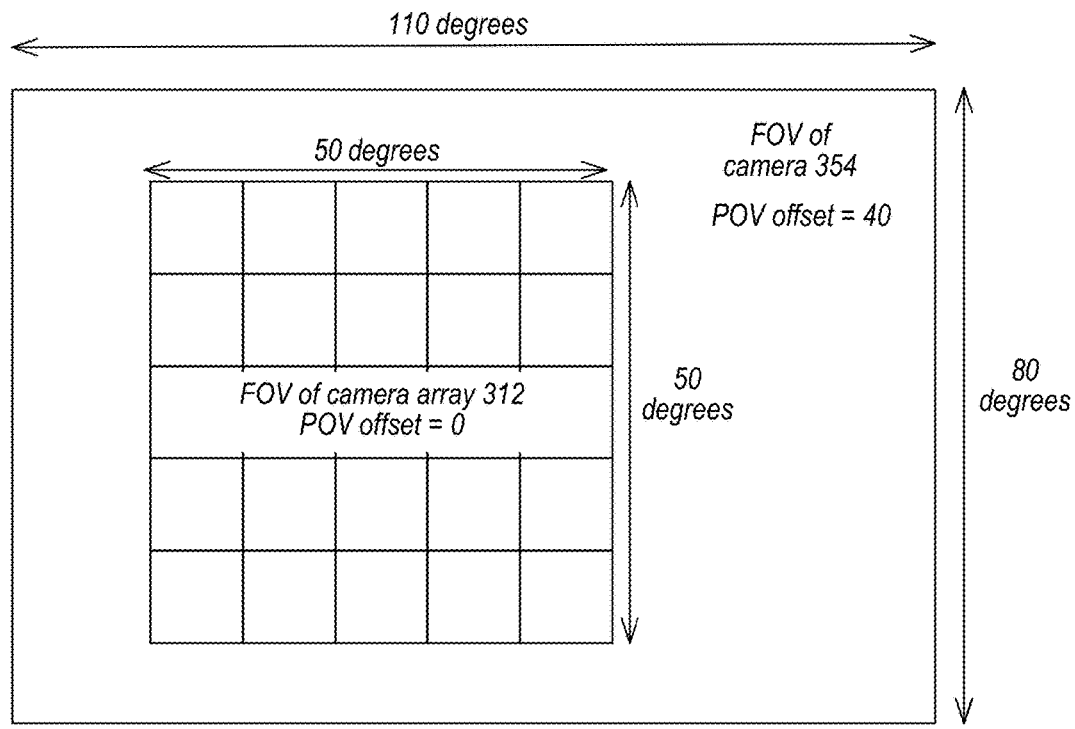

FIGS. 6A and 6B illustrate using a front-facing camera to reduce the number of cameras in the arrays, according to some embodiments. In some embodiments, the number of cameras in an array 312 may be reduced using a standard front-facing camera 354 to capture at least a part of the FOV. As shown in FIG. 6A, he HMD 310 includes one or more display panels 314 (e.g., one display panel 314 for each eye), one or more lenses 316 (e.g., one lens 316 for each eye) through which the user views images displayed on the display panels 314, one or more camera arrays 312 (e.g., one array 312 for each eye), and at least one front-facing camera 354. Camera array 312 includes cameras (e.g., as illustrated in FIGS. 2 and 3) that cover a region of interest (e.g., a 50×50 degree region as shown in FIG. 6B) of the FOV. The optics of the cameras in the array 312 are configured so that the entrance pupil of the cameras in the array 312 are at or near the subject's respective eye to correct the point of view (POV) for the region of interest of the FOV. Camera 354 may cover a wide region of the FOV, for example an 80×110 degree region, as shown in FIG. 6B. Camera 354 has a POV offset with respect to the user's eye, for example a 40 mm POV offset.

Figure 7A:
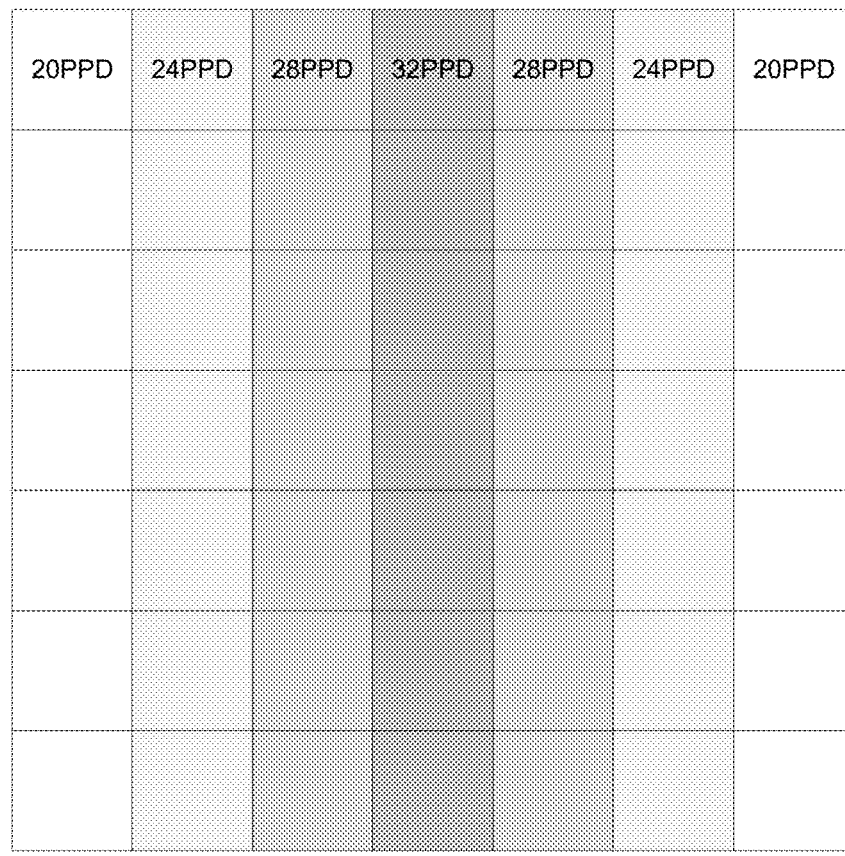
Figure 7B:
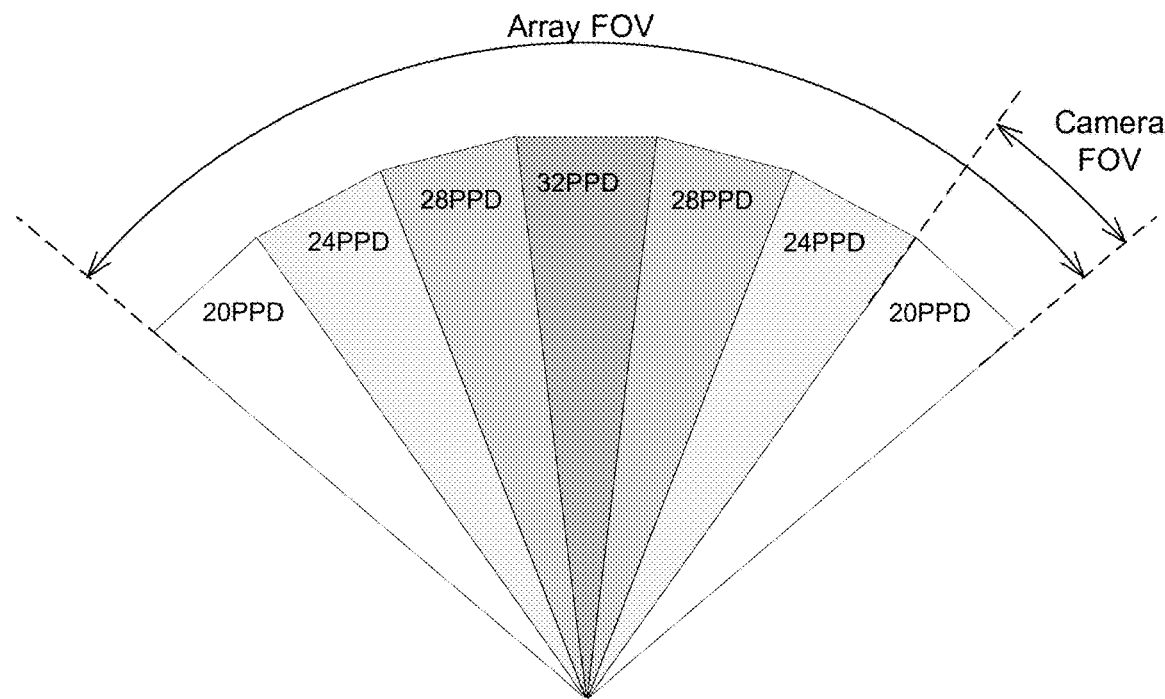

FIGS. 7A and 7B illustrate reducing the number of pixels by reducing resolution of the cameras in peripheral regions, according to some embodiments. In some embodiments, the total number of pixels that are read from the sensors in a camera array and processed by the image processing pipeline of the controller may be reduced by reducing resolution of the cameras in peripheral regions of the FOV. FIGS. 7A and 7B show a non-limiting example in which each camera array includes 49 (7×7) cameras. Cameras in a middle column capture images with a resolution of 32 pixels per degree (PPD). The columns of cameras towards the periphery have progressively lower resolution (28 PPD, 24 PPD, and 20 PPD, in this example.) Thus, the cameras towards the periphery of the FOV of the camera array capture images with fewer total pixels than the cameras towards the center of the FOV of the camera array. For example, assuming that the FOV of each camera is 15×15 degrees, in this example the center column of cameras would each capture 230,400 pixels, while the cameras in the columns towards the periphery would each capture 176,400, 129,600, and 90,000 pixels, respectively.

Figures 7C, 7D:
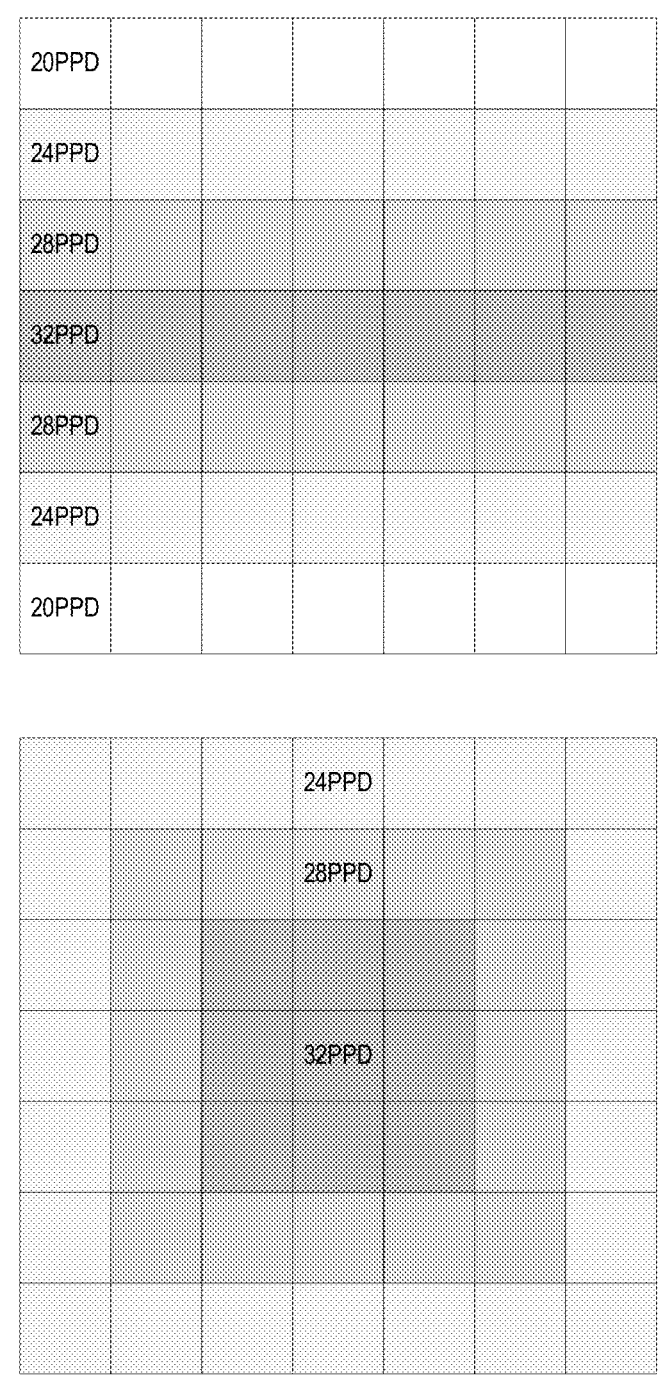

While FIGS. 7A and 7B show a pattern in which the resolution of the cameras decreases in horizontal directions from the center column(s) of cameras, other patterns may be used. For example, FIG. 7C shows a pattern in which the resolution of the cameras decreases in vertical directions from the center row(s) of cameras. As another example, FIG. 7D shows a pattern in which the resolution of the cameras decreases in both the horizontal and vertical directions from a central region or camera of the array.

Figure 8A:
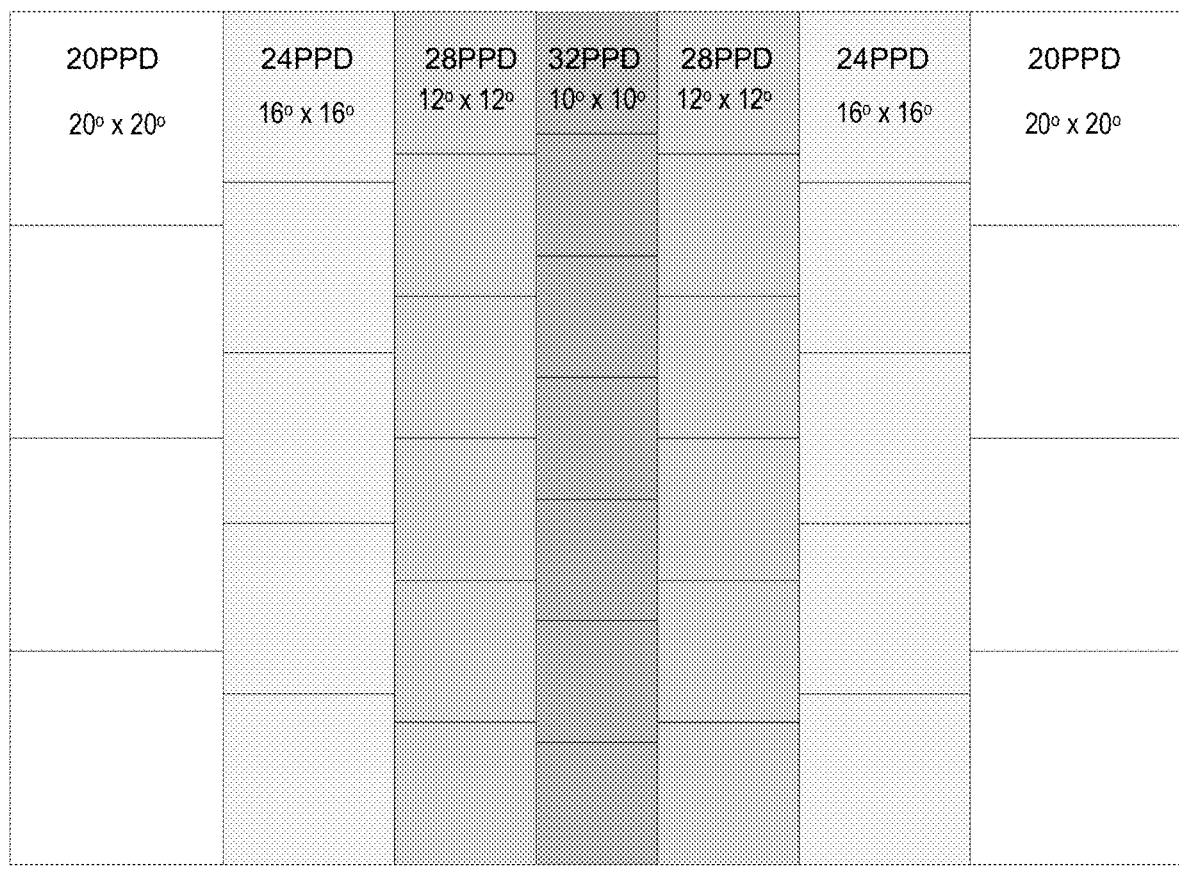
FIGS. 8A and 8B illustrate reducing the number of cameras by reducing resolution and increasing field of view (FOV) of the cameras in peripheral regions, according to some embodiments.
Figure 8B:
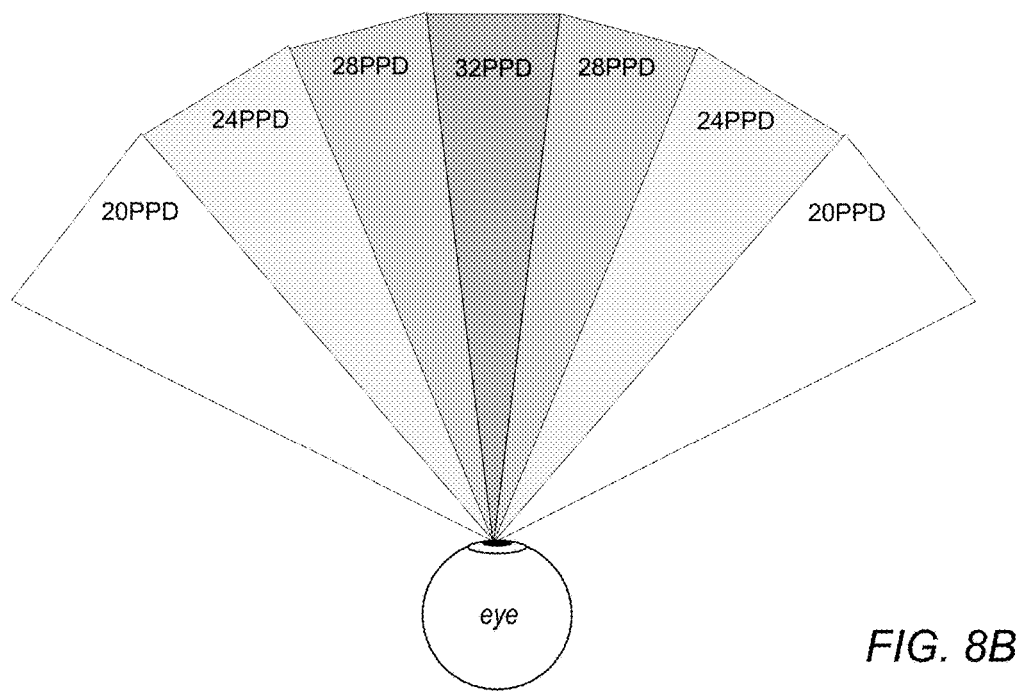

FIGS. 8A and 8B illustrate reducing the number of cameras by reducing resolution and increasing field of view (FOV) of the cameras in peripheral regions, according to some embodiments. In these embodiments, the number of cameras in an array, and the number of pixels that are read from the sensors and processed by the image processing pipeline, may be reduced by reducing resolution and increasing FOV of the cameras in peripheral regions. FIGS. 8A and 8B show a non-limiting example in which the cameras in a middle column have a 10×10 degree FOV and capture images with a resolution of 32 pixels per degree (PPD). The columns of cameras towards the periphery have progressively wider FOVs (12×12 degrees, 16×16 degrees, and 20×20 degrees, in this example) and lower resolution (28 PPD, 24 PPD, and 20 PPD, in this example.)

While FIGS. 8A and 8B show a pattern in which the resolution and FOV of the cameras decreases in horizontal directions from the center column(s) of cameras, other patterns may be used. For example, the resolution and FOV of the cameras may instead or also be decreased in vertical directions from the center row(s) of cameras.

Figure 9A:
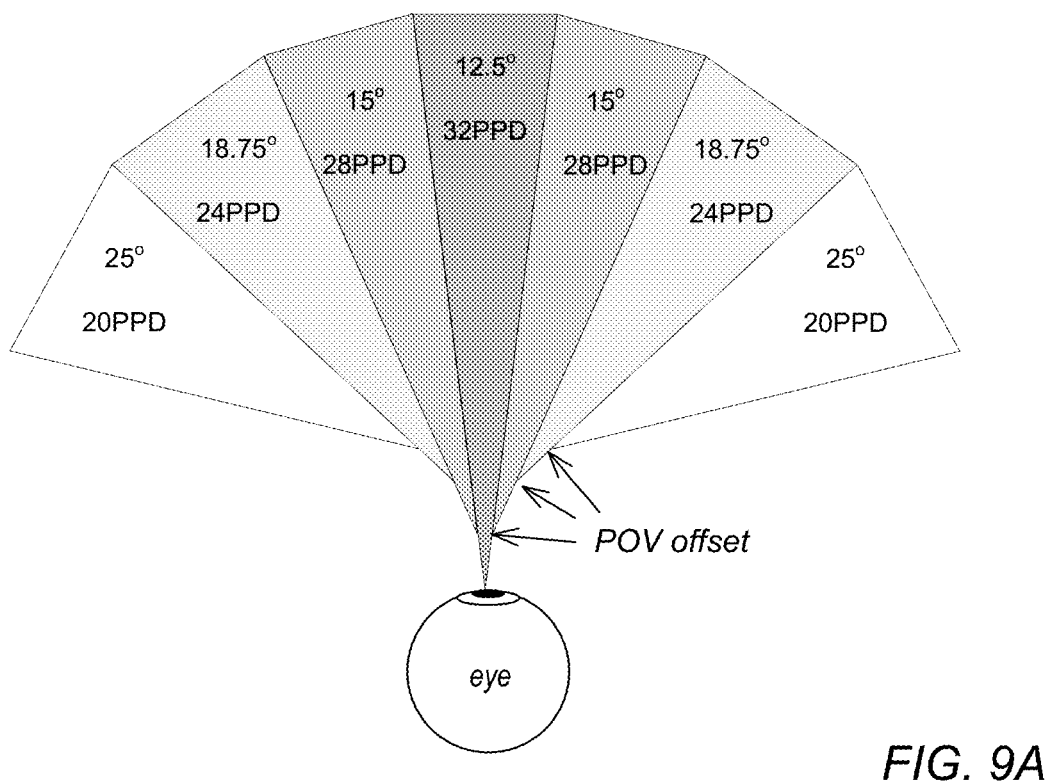
FIGS. 9A and 9B illustrate reducing the number of cameras by reducing resolution and shifting the entrance pupil of the cameras in peripheral regions, according to some embodiments.
Figure 9B:
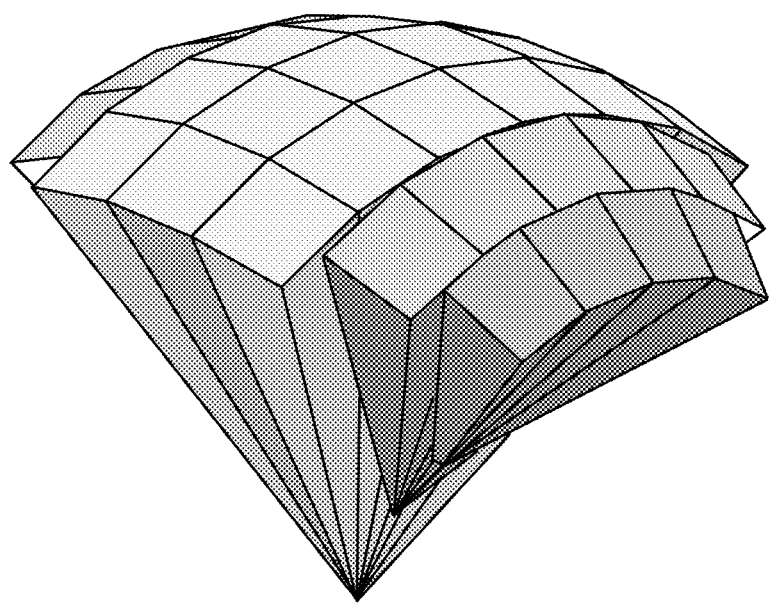

FIGS. 9A and 9B illustrate reducing the number of cameras by reducing resolution, increasing FOV, and shifting the entrance pupil of the cameras in peripheral regions, according to some embodiments. In these embodiments, a camera array similar to that shown in FIG. 8A may be used. FIG. 9A shows a non-limiting example in which the cameras in a middle column have a 12.5×12.5 degree FOV and capture images with a resolution of 32 pixels per degree (PPD). The columns of cameras towards the periphery have progressively wider FOVs (15 degrees, 18.75 degrees, and 25 degrees, in this example) and lower resolution (28 PPD, 24 PPD, and 20 PPD, in this example). However, in addition to increasing the FOV and decreasing the resolution towards the periphery of the array, the entrance pupils of the cameras are shifted away from the user's eye towards the periphery. Thus, the POV is correct in the center of the array, and the POV is progressively offset towards the periphery.

Figures 10A, 10B:
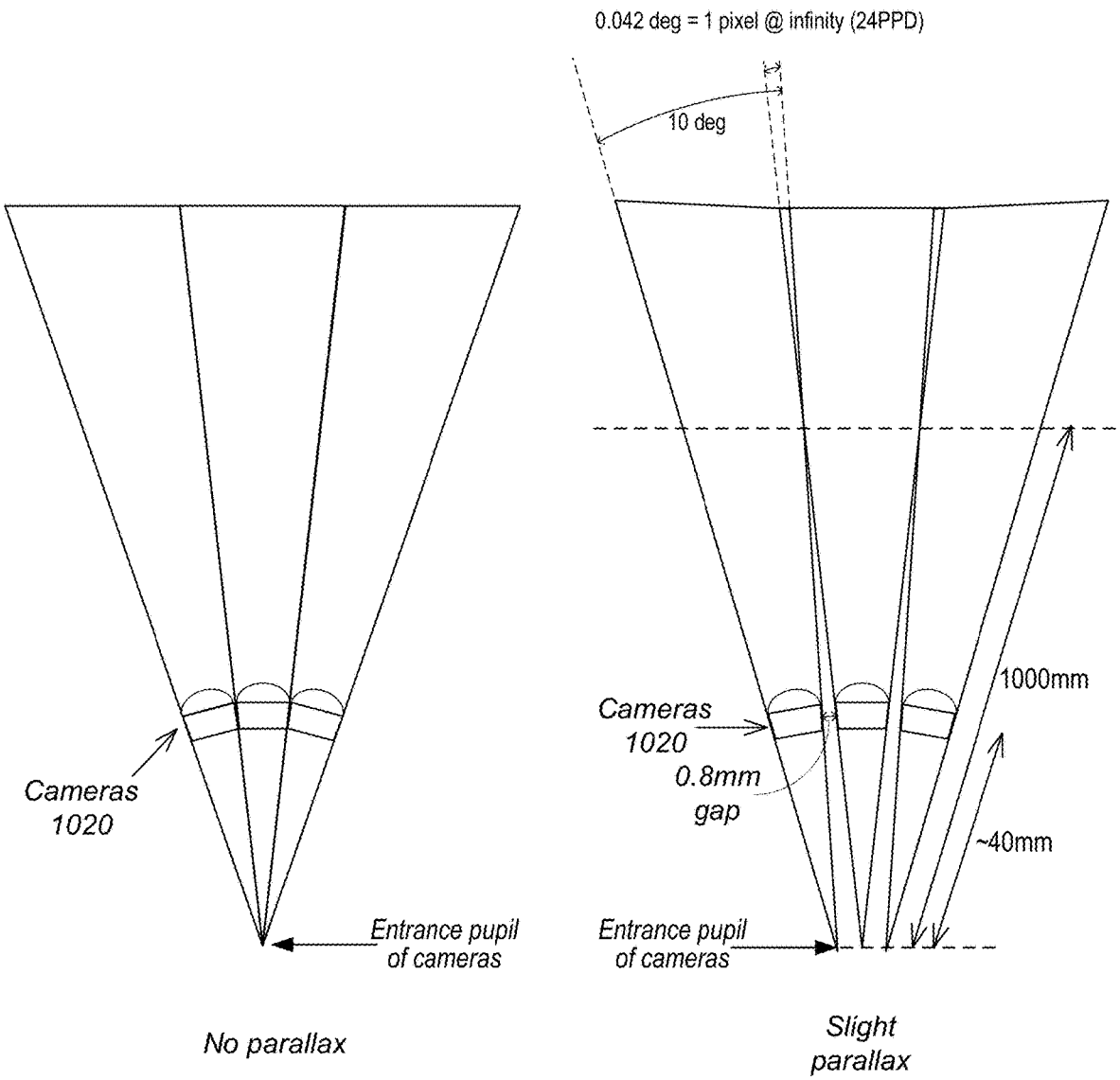
FIGS. 10A and 10B illustrate introducing slight parallax to the cameras to reduce vignetting, according to some embodiments.

FIGS. 10A and 10B illustrate introducing slight parallax to the cameras to reduce vignetting, according to some embodiments. FIG. 10A shows an example in which there is no parallax between the cameras 1020 in an array. The FOV of the cameras 1020 do not overlap, and the cameras 1020 are adjacent to each other. However, this configuration may result in significant vignetting at the edge of the lenses, at least 50 percent around that chief ray. FIG. 10B shows an example in which there is slight parallax between the cameras 1020 in an array. This example uses cameras 1020 with 10 degree FOV, with resolution of 24 PPD. The cameras 1020 are configured so that there is slight parallax (0.042 degree overlap=1 pixel @ infinity). By introducing parallax so that the FOVs overlap slightly, vignetting at the edges of the lenses can be significantly reduced. Further, this may provide spacing (e.g., 0.8 mm in this example) between cameras 1020 and may simplify the mechanical tolerance of where the cameras can be positioned, allowing for easier alignment and simpler lens cuts. Note that the small (e.g., 1 pixel) amount of parallax is not noticeable to the user, whereas significant vignetting between the lenses degrades SNR and MTF at the edge of the images, and may significantly degrade overall image quality.

Figure 11A:
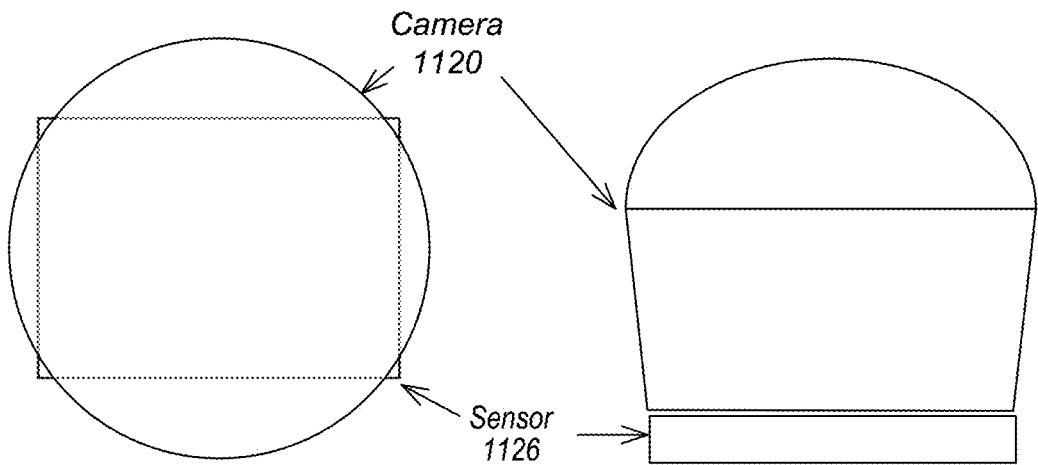
FIGS. 11A and 11B illustrate using one sensor for multiple cameras, according to some embodiments.
Figure 11B:
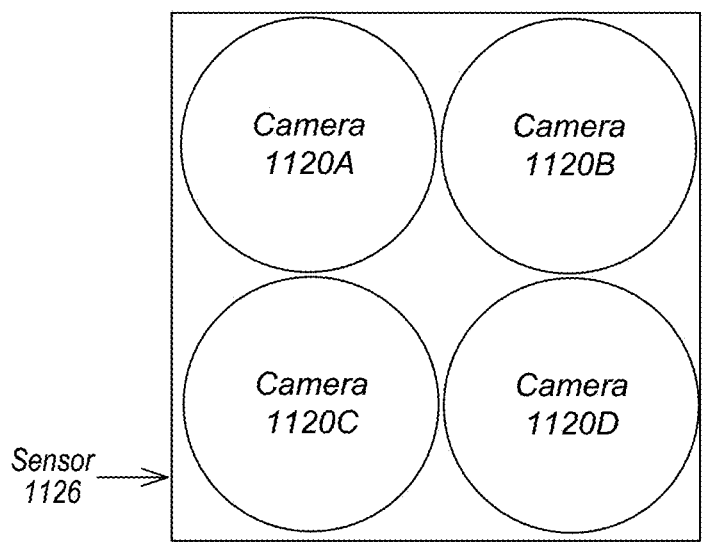

FIGS. 11A and 11B illustrate using one sensor for multiple cameras, according to some embodiments. FIG. 11A shows an example in which one sensor 1126 is used to capture images for each camera 1120. Thus, there are as many sensors in the array as there are cameras. FIG. 11B shows an example in which one sensor 1126 is used to capture images from multiple cameras 1120. This example shows four cameras 1120A-1120D per sensor 1126. Thus, each sensor 1126 simultaneously captures four images. Assuming an example array that includes 10×10 cameras, this would reduce the number of sensors needed from 100 to 25.

Figure 12:
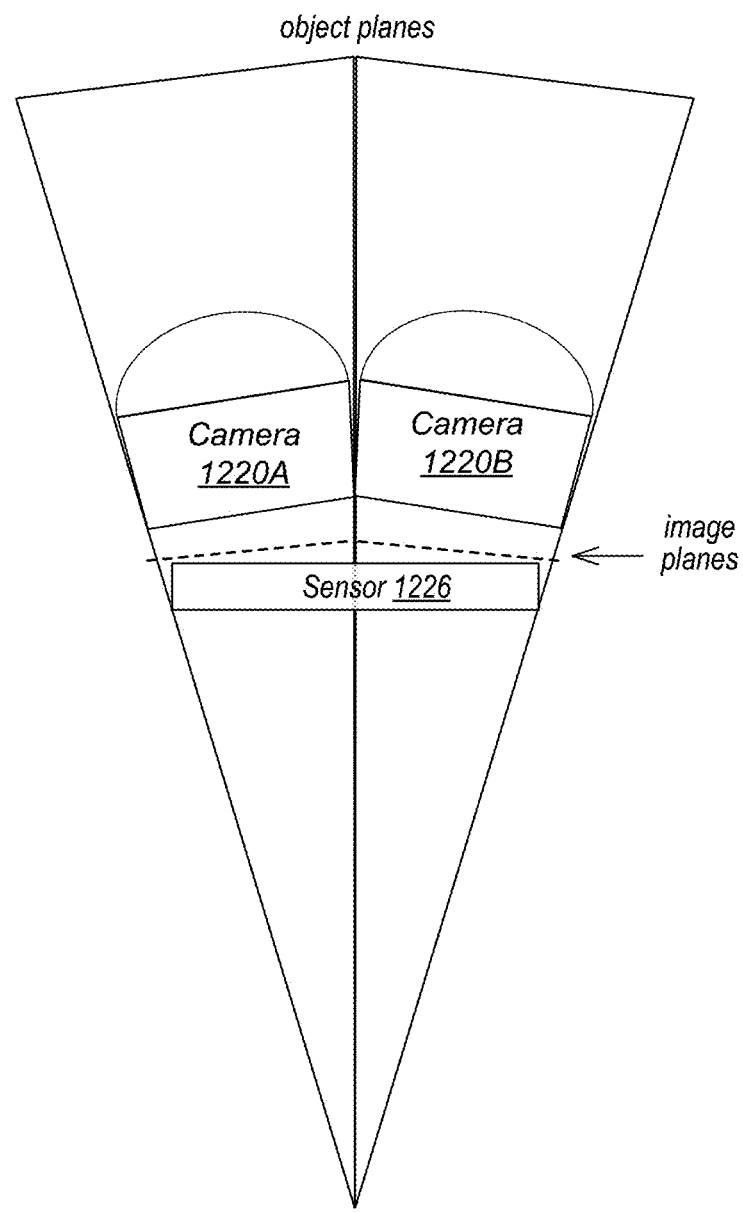
FIG. 12 illustrates misaligned image planes with respect to the sensor when using one sensor for multiple cameras.
Figure 13:
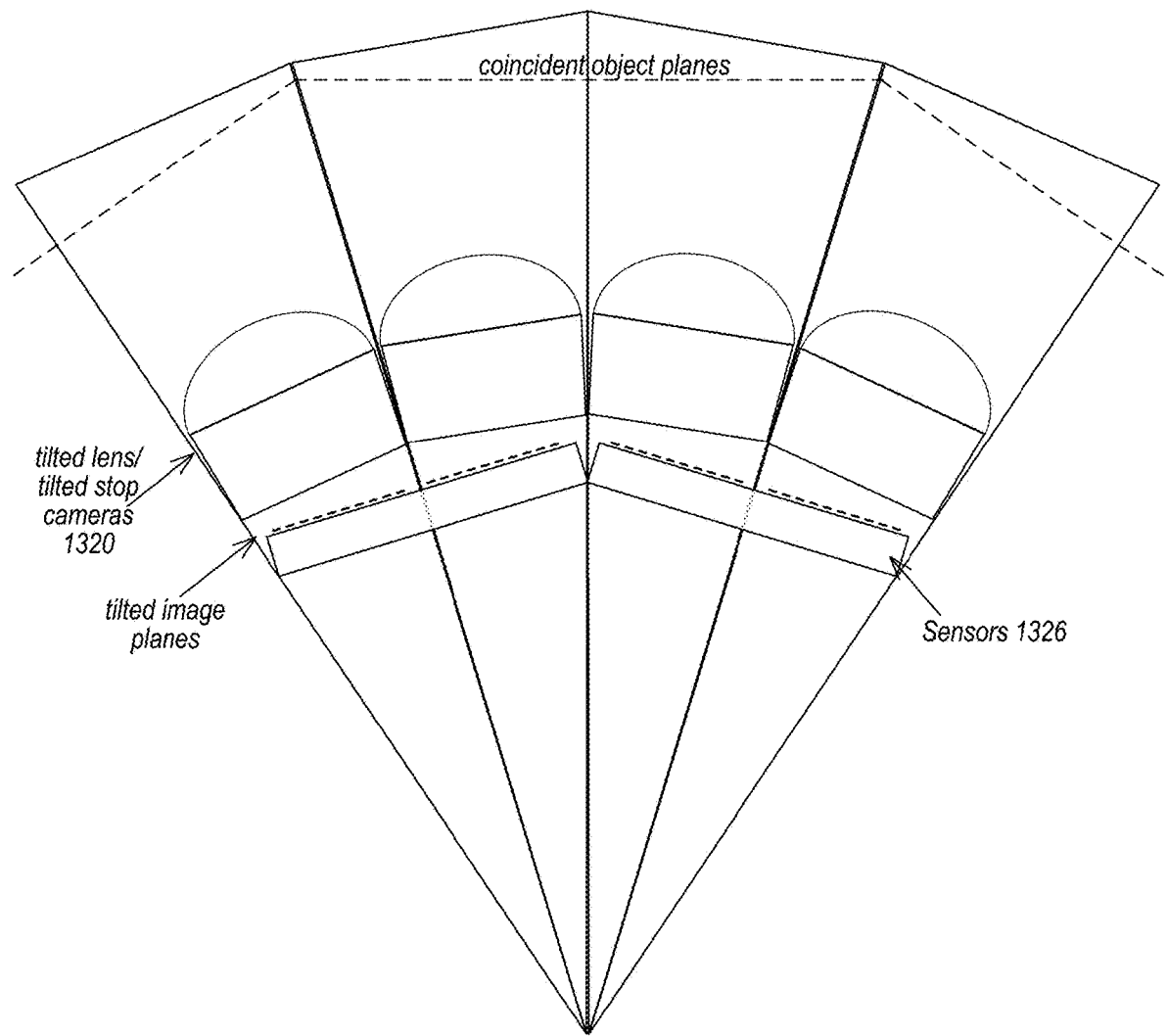
FIG. 13 illustrates shifting the optics of the cameras to align the image planes with the sensor, according to some embodiments.

FIG. 12 illustrates misaligned image planes with respect to the sensor when using one sensor for multiple cameras. If no correction is done when using one sensor to capture images from multiple cameras as shown in FIG. 11, the image planes of the cameras 1120 would be misaligned with the sensor 1226 as shown in FIG. 12. However, the optics (e.g., one or more of the lenses and/or the aperture stop) of a camera 1220 may be shifted, tilted or otherwise adjusted to tilt the image plane of the camera 1220. Thus, as shown in FIG. 13, in some embodiments, for each sensor 1326, the optics of the four cameras 1320 associated with that sensor 1326 may be appropriately adjusted to tilt the image planes of the cameras 1320 so that the image planes of the cameras 1320 are aligned with the sensor 1326 surface plane.

Figure 14:
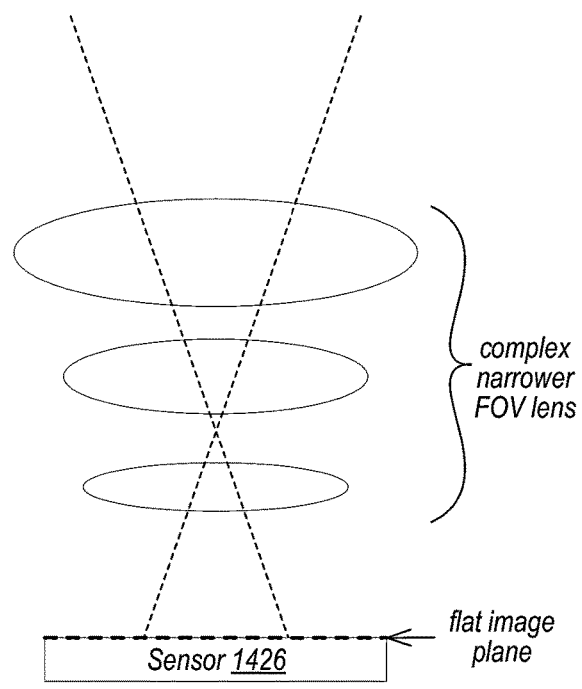
FIG. 14 illustrates a flat sensor and relatively complex lens system that may be used in a camera array, according to some embodiments.
Figure 15:
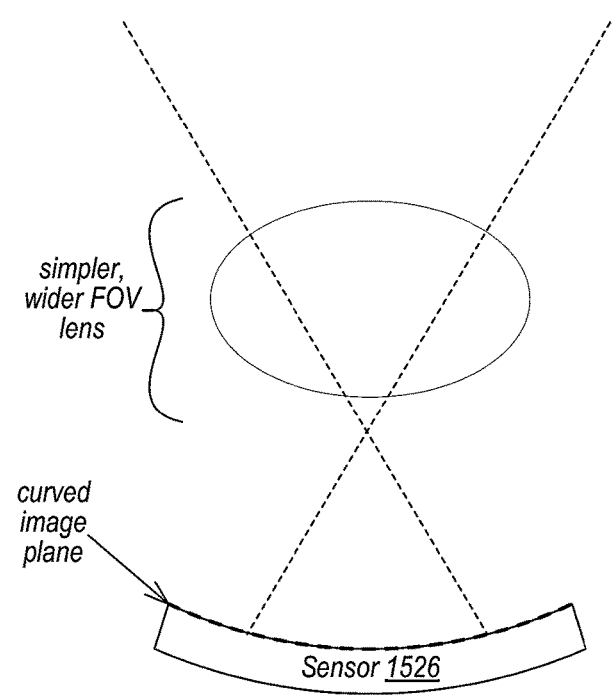
FIG. 15 illustrates using a curved sensor and simpler lens system to provide a wider FOV and reduce the number of cameras in a camera array, according to some embodiments.

FIG. 14 illustrates a flat sensor 1426 and relatively complex lens system that may be used in a camera array, according to some embodiments. A goal of the AR/VR system as described herein is for the camera array to include as few cameras as possible. However, this goal requires each individual camera to have a wider FOV. Using conventional optics as shown in FIG. 14, this may require a complex lens with several lens elements per camera, which adds cost and complexity. FIG. 15 illustrates using a curved sensor 1526 and simpler lens to provide a wider FOV and reduce the number of cameras in a camera array, according to some embodiments. As an alternative to using conventional optics with a flat sensor 1426 and complex lens system as shown in FIG. 14, in these embodiments, a curved sensor 1526 or a sensor with a curved fiber taper may be used. The curved sensor 1526 allows a simpler lens that produces a curved image plane at the curved surface of sensor 1526 to be used in the camera. The lens may be less complex than the lens system used with a flat sensor 1426 in the camera of FIG. 14, and thus may be less costly and easier to manufacture. In addition, the camera shown in FIG. 15 may provide a wider FOV than the camera shown in FIG. 14, which may allow fewer cameras to be used in the camera array.

Negative Meniscus Front Lens

FIGS. 9A and 9B illustrate a camera array in which different camera designs/camera lenses are used so that the columns of cameras towards the periphery of the array have progressively wider FOVs and lower resolution. In addition to increasing the FOV and decreasing the resolution towards the periphery of the array, the entrance pupils of the cameras are shifted away from the user's eye towards the periphery. Thus, the POV is correct in the center of the array, and the POV is progressively offset towards the periphery.

FIGS. 16 through 20C illustrate using a negative meniscus lens to provide progressively wider FOVs and lower resolution towards the periphery of a camera array, according to some embodiments. In addition to increasing the FOV and decreasing the resolution towards the periphery of the array, the negative meniscus lens may shift the entrance pupils of the cameras away from the user's eye towards the periphery. Thus, the POV is correct in the center of the array, and the POV is progressively offset towards the periphery. In these embodiments, the same camera design can be used for all of the cameras in the array. However, a negative meniscus lens is placed in front of the array to provide progressively wider FOVs and lower resolution towards the periphery of array, and to progressively offset the POV towards the periphery of the array. Thus, similar effects to those achieved by the embodiments described in reference to FIGS. 9A and 9B can be achieved by using the same camera design for the cameras in the array and adding a meniscus lens in front of the array without the complexity of having different camera designs in the columns of the array.

Figure 16:
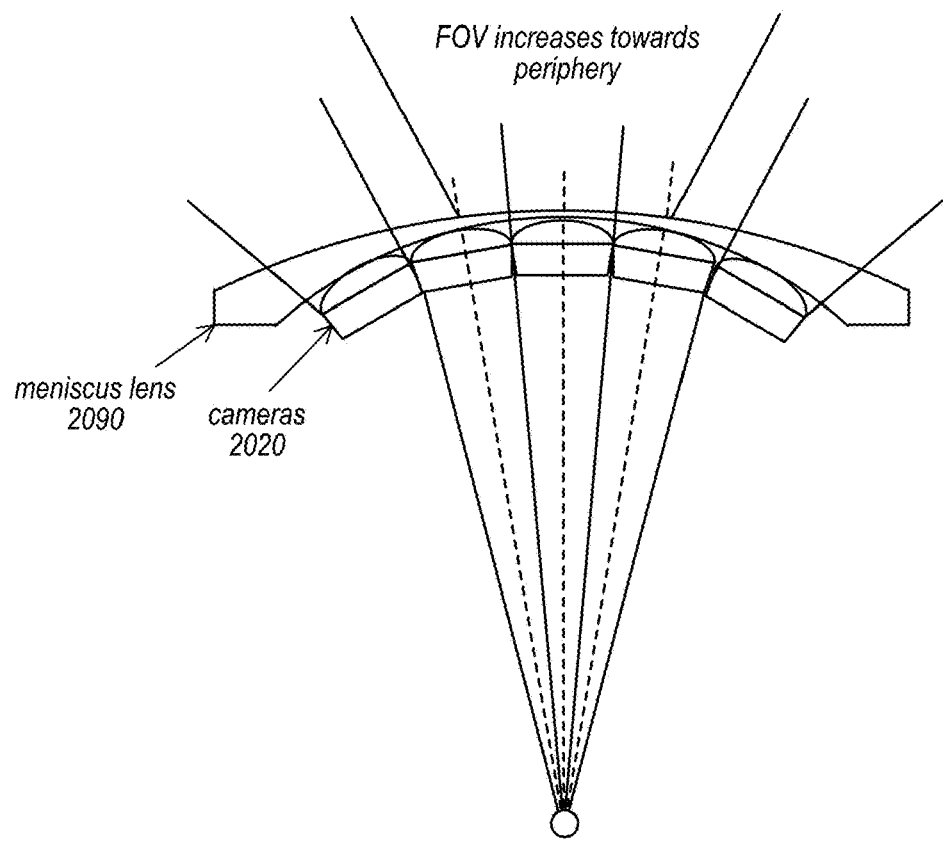
FIG. 16 graphically illustrates adding a negative meniscus lens in front of a camera array to increase the field of view (FOV) of the cameras towards the periphery, according to some embodiments.

FIG. 16 graphically illustrates that adding a negative meniscus lens 2090 in front of the cameras 2020 in a camera array increases the FOV of the cameras towards the periphery. All of the cameras 2020 in the array may be identical, using the same lenses and sensors, and thus all having the same FOV. However, the meniscus lens 2090 acts to increase the FOV for the cameras 2020 from the center of the array towards the periphery.

Figure 17:
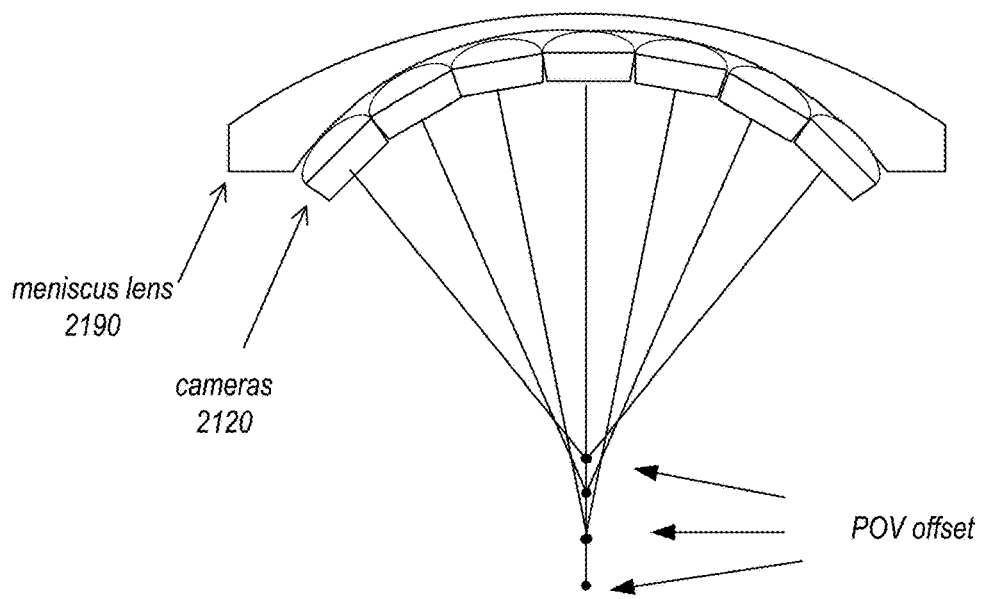
FIG. 17 graphically illustrates adding a negative meniscus lens in front of a camera array to progressively offset the point of view (POV) of the cameras towards the periphery, according to some embodiments.

FIG. 17 graphically illustrates that adding a negative meniscus lens 2190 in front of the cameras 2120 in a camera array progressively offsets the POV towards the periphery. The entrance pupil (EP) of the center camera 2120 is correct; the meniscus lens has the effect of moving the EP forward with the increasing FOV.

Figure 18:
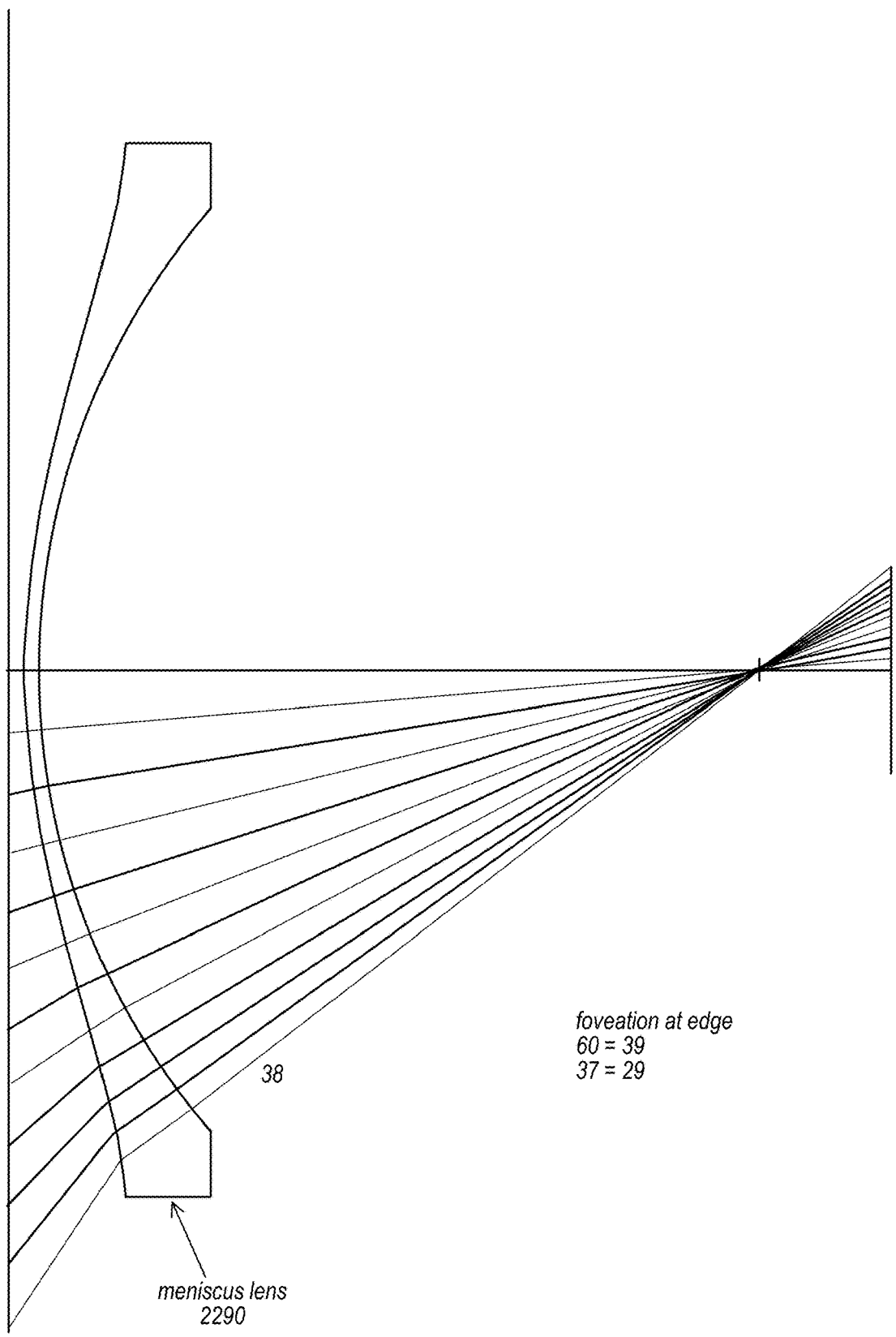
FIG. 18 graphically illustrates adding a negative meniscus lens in front of a camera array to reduce pixels per degree (PPD) towards the periphery, according to some embodiments.

FIG. 18 graphically illustrates that, by increasing the FOV of the cameras 2290 progressively towards the periphery, the meniscus lens reduces pixels per degree (PPD) towards the periphery. The pixels captured by the camera sensors are magnified to a larger size in the object space towards the periphery by the meniscus lens 2290. The magnification changes (increases) with increasing FOV towards the periphery, which is equivalent to saying that the PPD is decreasing towards the periphery. The spacing between the pixels thus gets wider towards the periphery. This allows embodiments of the camera array to use fewer pixels to cover the entire FOV, with higher resolution in the middle and lower resolution towards the periphery. This allows the camera array to be smaller in total surface area, thus requiring fewer cameras, fewer sensors, and reducing the bandwidth required to move pixels.

Figure 19:
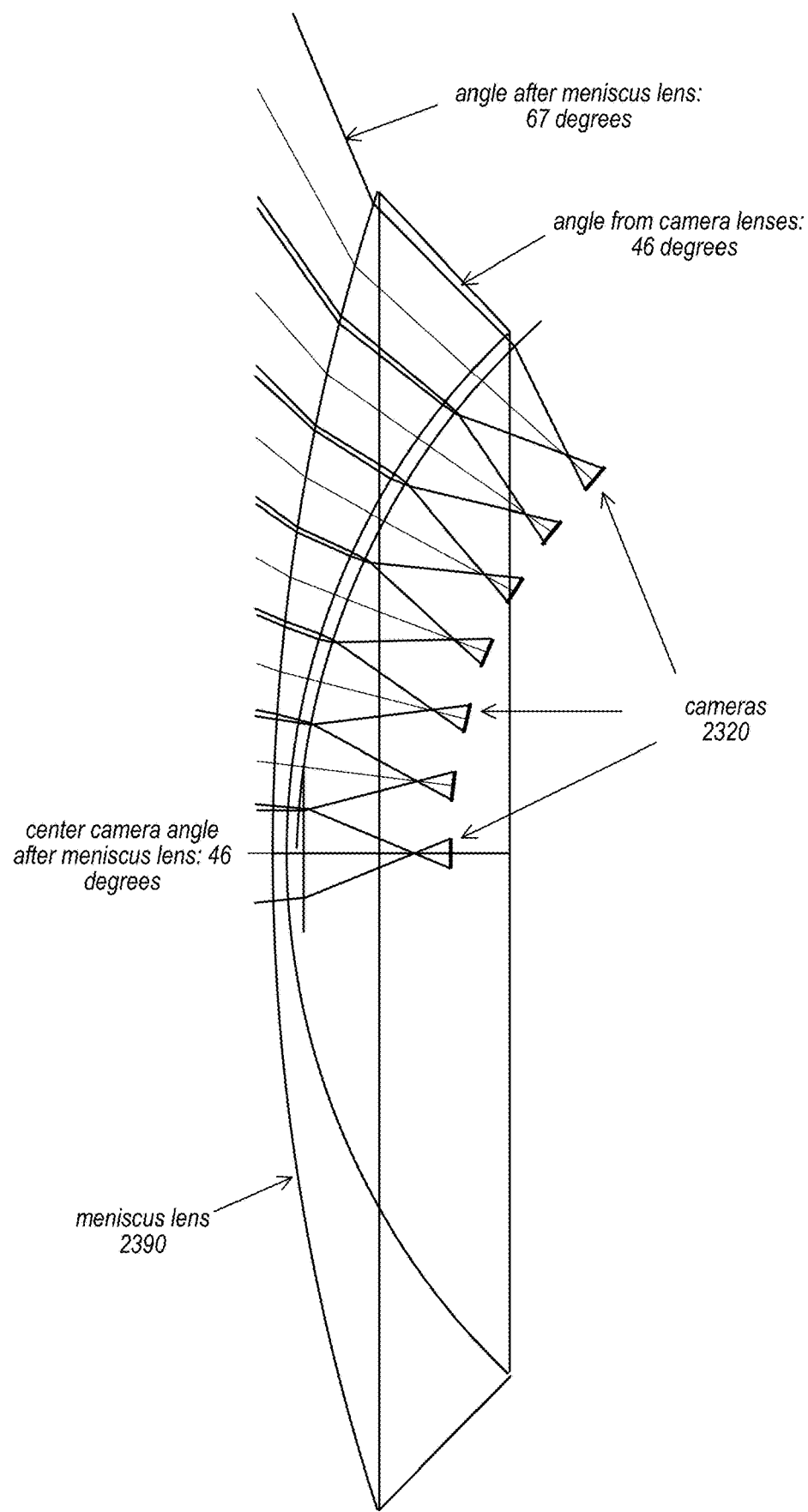
FIG. 19 illustrates a non-limiting example of a camera array and negative meniscus lens, according to some embodiments.

FIG. 19 illustrates a non-limiting example in which the cameras 2320 in an array have a FOV before the meniscus lens 2390 of 46 degrees, according to some embodiments. After the meniscus lens 2390, the center camera has a FOV of 46 degrees. The FOV of the cameras 2320 is increased by the meniscus lens 2390 towards the periphery; the edge camera 2320 has a FOV of 67 degrees after the meniscus lens 2390.

Figure 20A:
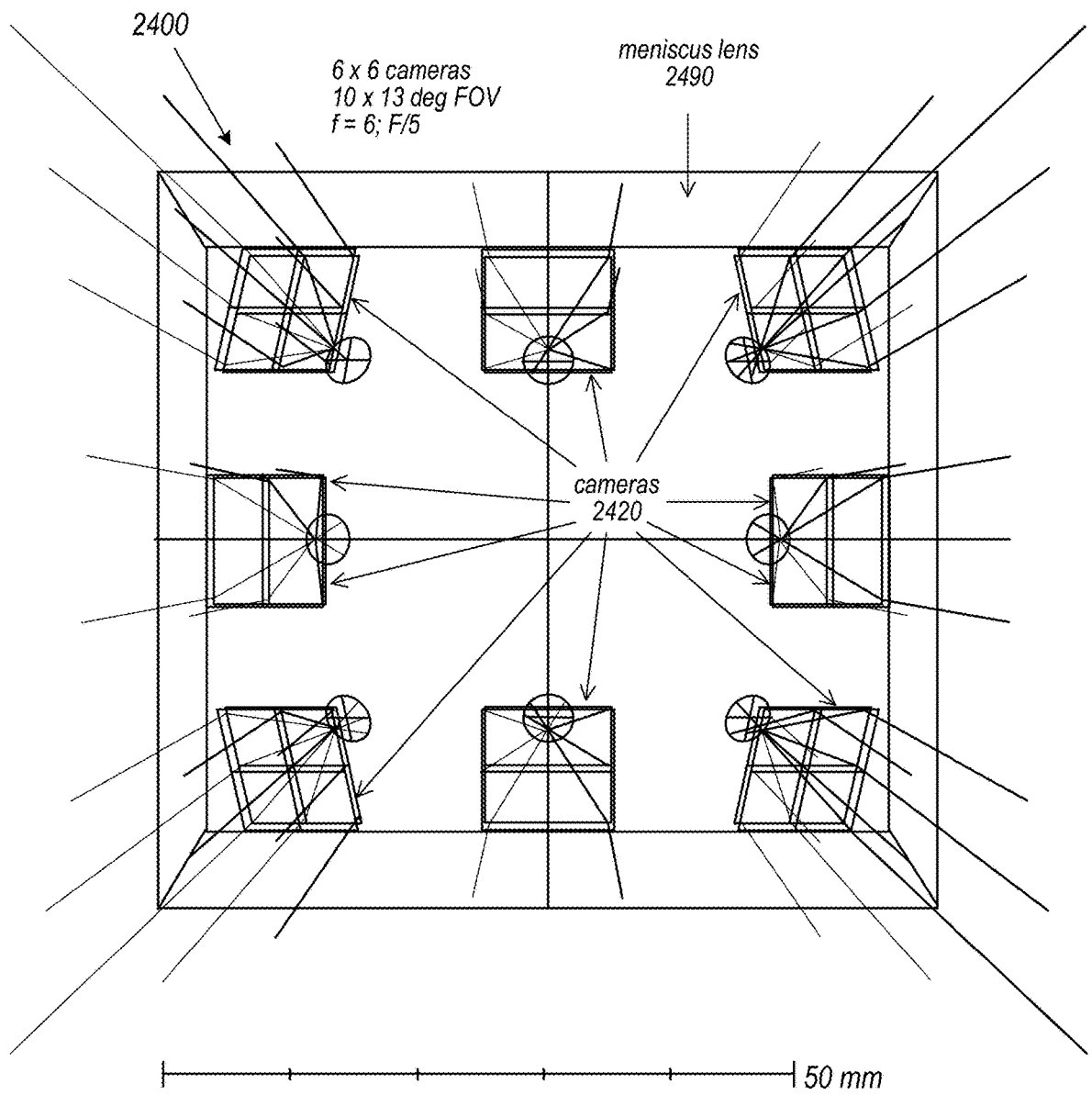
FIGS. 20A through 20C graphically illustrate an example scene camera that includes a negative meniscus lens in front of the cameras in the camera array, according to some embodiments.
Figure 20B:
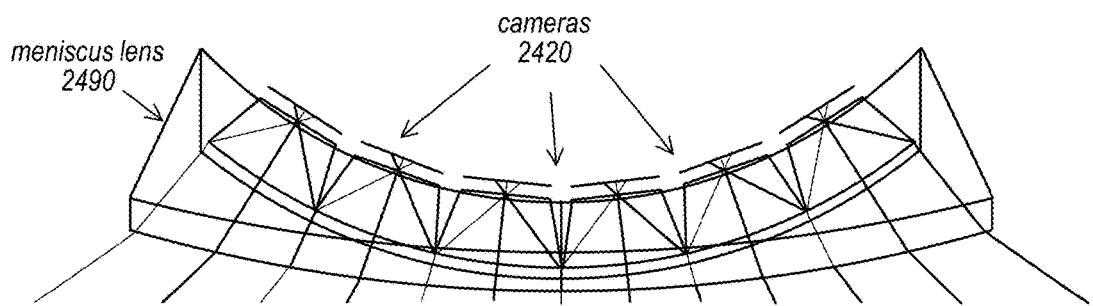
Figure 20C:
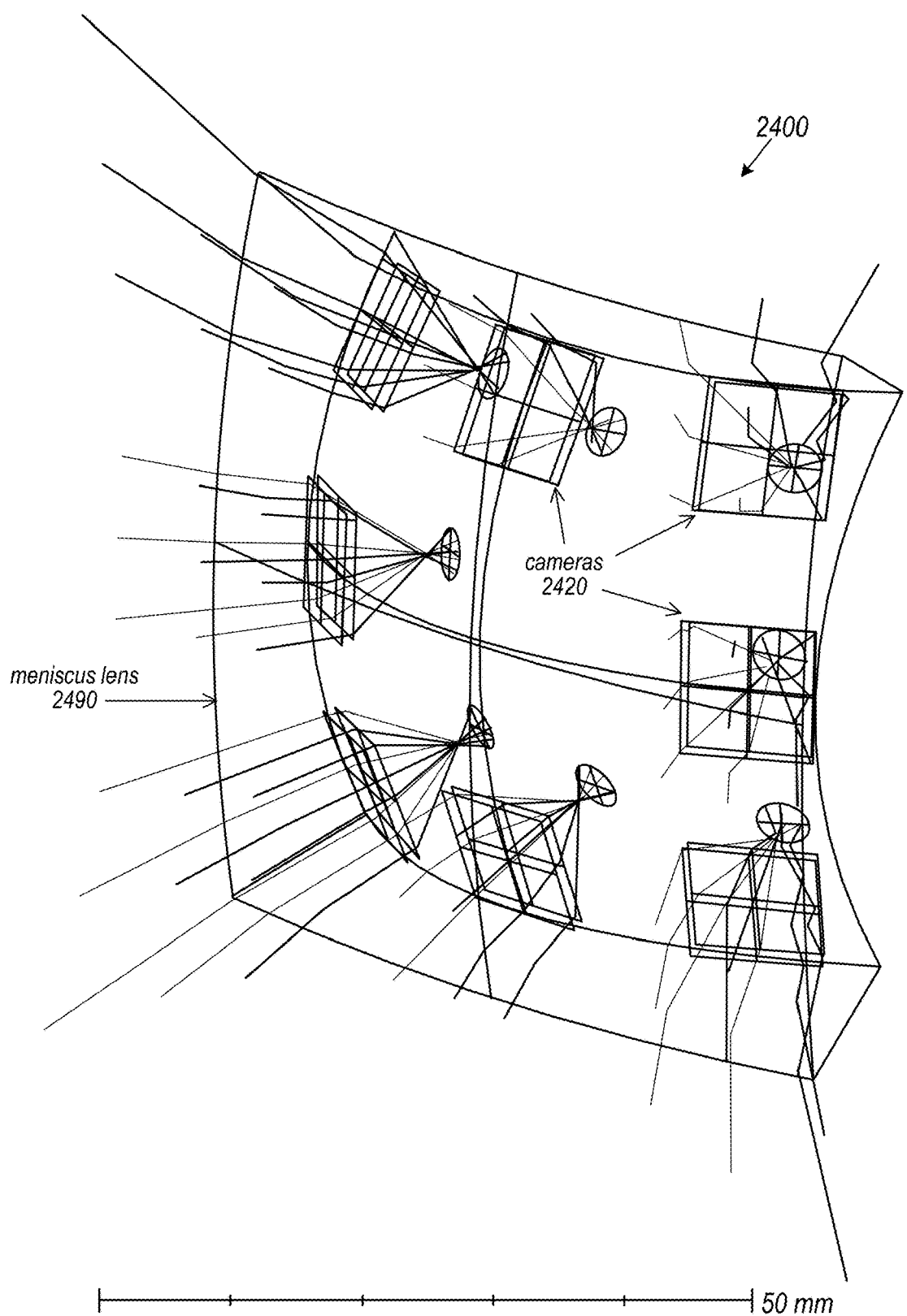

FIGS. 20A through 20C graphically illustrate an example scene camera 2400 that includes a negative meniscus lens 2490 in front of the cameras 2420 in the camera array, according to some embodiments. In this example, the camera array may be a 6×6 array of cameras 2420. In an example non-limiting embodiment, each camera has a 10×13 degree FOV (before the meniscus lens 2490), focal length (f) 6, and F-number F/5. The cameras 2420 may all be same (i.e., may all use the same lens and sensor type). FIG. 20A shows a front view of the scene camera 2400. FIG. 20B shows a top view of the scene camera 2400. FIG. 20C shows a perspective view of the scene camera. Note that, for simplicity only some of the cameras are shown in the Figures. Further note that various embodiments may include more or fewer cameras 2420, the cameras 2420 may be arranged differently.

Aspects of at least some embodiments of the invention are further illustrated by the following clauses:

Clause 1: A system, comprising:
a camera comprising, from an object side of the camera to an image side of the camera:
a first lens group comprising one or more lens elements;
an aperture stop; and
a second lens group comprising one or more lens elements;
an image sensor configured to capture images formed by the camera at an image plane at or near surface of the image sensor;
wherein the entrance pupil of the camera is a virtual image of light refracted by the first lens group formed by the aperture stop; and
wherein the entrance pupil of the camera is formed at a plane located behind the image plane formed at the image sensor.

Clause 2: The system as recited in Clause 1, wherein the aperture stop forms a pinhole aperture for the camera.

Clause 3: The system as recited in Clause 1, wherein the first lens group and the aperture stop are configured to optimize the virtual image at the entrance pupil plane.

Clause 4: The system as recited in Clause 3, wherein the second lens group is configured to correct for aberrations to optimize an image formed at an image plane at or near an object-side surface of the image sensor.

Clause 5: The system as recited in Clause 1, wherein the one or more lens elements in the first lens group are formed so that the camera fits together with one or more cameras in an array of cameras with minimal or no gaps between the first lens groups of the cameras.

Clause 6: The system as recited in Clause 1, wherein one or more of the lens elements in the first lens group are square or rectangular lenses.

Clause 7: The system as recited in claim Clause 1, wherein field of view of the camera is within a range of 10 to 25 degrees.

Clause 8: The system as recited in claim Clause 1, wherein the camera has a 10×13 degree field of view, focal length 6 millimeters, and F-number F/5.

Clause 9: The system as recited in Clause 1, wherein the camera has a 14 degree diagonal field of view, focal length 8.5 millimeters, F-number F/8.5, and optical total track length 10 millimeters.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
   a two-dimensional array of cameras, wherein each camera in the array is configured to capture light from a respective portion of a field of view (FOV) in front of the device, wherein each camera in the array comprises, from an object side of the camera to an image side of the camera:
      a first lens group comprising one or more lens elements;
      an aperture stop; and
      a second lens group comprising one or more lens elements; and
   a plurality of image sensors configured to capture images formed by the two-dimensional array of cameras at image planes at or near surfaces of the image sensors;
   wherein entrance pupils of at least some of the cameras in the array are formed at a common plane located behind the image planes formed at the image sensors; and
   wherein the cameras are arranged in the array to provide an amount of parallax between adjacent cameras to reduce vignetting and provide spacing between the adjacent cameras.

2. The device as recited in claim 1, wherein the amount of parallax between the adjacent cameras is one pixel at infinity.

3. The device as recited in claim 1, wherein the common plane is located at or near a user's eye so that the array of cameras captures views of a scene in front of the device from substantially a same perspective as the user's eye.

4. The device as recited in claim 1, wherein the entrance pupil of a given camera is a virtual image of the light refracted by the first lens group formed by the aperture stop.

5. The device as recited in claim 4, wherein the first lens group and the aperture stop are configured to optimize the virtual image at the entrance pupil plane.

6. The device as recited in claim 5, wherein the second lens group is configured to correct for aberrations to optimize an image formed at an image plane at or near an object-side surface of a respective one of the image sensors.

7. The device as recited in claim 1, wherein the device further comprises:
   a camera; and
   a prism that reflects light that enters the object side surface of the prism to the camera to cover a portion of the FOV in front of the device.

8. The device as recited in claim 1, wherein the device further comprises a front-facing camera that covers a portion of the FOV in front of the device.

9. The device as recited in claim 1, wherein one or more cameras in peripheral portions of the array are configured to capture images at lower resolution than one or more cameras in a center portion of the array.

10. The device as recited in claim 1, wherein one or more cameras in peripheral portions of the array cover larger portions of the FOV than one or more cameras in a center portion of the array.

11. The device as recited in claim 1, wherein the entrance pupils of one or more cameras in a center portion of the array are formed at a plane located at a user's eye, and wherein the entrance pupils of one or more cameras in peripheral portions of the array are formed at one or more planes located between the user's eye and the respective image sensors.

12. The device as recited in claim 1, wherein there is one image sensor for each camera in the array.

13. The device as recited in claim 12, wherein the image sensor is a curved sensor.

14. The device as recited in claim 1, wherein each of the plurality of image sensors captures images for two or more of the cameras in the array.

15. The device as recited in claim 14, wherein the lens elements and aperture stops of the two or more cameras are configured to tilt the image planes of the respective cameras to align the image planes with the surface of the respective image sensor.

16. The device as recited in claim 1, further comprising a negative meniscus lens located in front of the array of cameras configured to provide progressively wider fields of view and lower resolution for the cameras from the center of the array towards the periphery of the array.

17. The device as recited in claim 1, wherein field of view of each camera in the array is within a range of 10 to 25 degrees.

18. The device as recited in claim 1, wherein focal length of each camera in the array is within a range of 4 to 12 millimeters, and wherein F-number of each camera in the array is within a range of 4 to 10.

19. The device as recited in claim 1, wherein total track length of each camera in the array is within a range of 7 millimeters to 15 millimeters.

20. The device as recited in claim 1, wherein resolution of each camera in the array is within a range of 20 to 32 pixels per degree (PPD).

* * * * *